United States Patent
Callinan et al.

(10) Patent No.: US 6,705,803 B2
(45) Date of Patent: Mar. 16, 2004

(54) TIRE FOUNDATION STRUCTURE

(76) Inventors: Garry Kevin Callinan, 20 Ranclaud Street, Merewether NSW 2291 (AU); Peter Chapman, 105 Taringa Parade, Indooroopilly QLD 4068 (AU)

( * ) Notice: Subject to any disclaimer, the term of this patent is extended or adjusted under 35 U.S.C. 154(b) by 0 days.

(21) Appl. No.: 10/367,220

(22) Filed: Feb. 13, 2003

(65) Prior Publication Data

US 2003/0156906 A1 Aug. 21, 2003

Related U.S. Application Data

(63) Continuation of application No. 09/762,524, filed as application No. PCT/AU99/00640 on Aug. 6, 1999, now Pat. No. 6,533,501.

(51) Int. Cl.$^7$ .............................. E01C 3/00; E02B 3/10; E02B 3/12; E02D 27/00
(52) U.S. Cl. .......................... 405/229; 404/28; 404/31; 405/16; 405/25; 405/30; 405/32; 405/107; 405/258.1; 405/302.4; 405/302.6; 52/DIG. 9
(58) Field of Search ........................ 404/27–31; 405/15, 405/16, 25, 30–32, 129.75, 107, 229, 258.1, 302.4, 302.6, 303; 52/DIG. 9

(56) References Cited

U.S. PATENT DOCUMENTS

| | | | | |
|---|---|---|---|---|
| 3,842,606 A | * | 10/1974 | Stiles et al. | 405/19 |
| 4,057,141 A | * | 11/1977 | Laurie et al. | 405/107 |
| 4,188,153 A | * | 2/1980 | Taylor | 405/34 |
| 4,850,738 A | * | 7/1989 | Niemi | 404/31 |
| 5,823,711 A | * | 10/1998 | Herd et al. | 405/36 |
| 5,915,880 A | * | 6/1999 | Nordberg | 405/126 |
| 6,375,387 B1 | * | 4/2002 | Gabor et al. | 405/18 |

FOREIGN PATENT DOCUMENTS

| | | |
|---|---|---|
| AU | 10006/95 | 7/1995 |
| FR | 2643400 | 8/1990 |
| NL | 7706564 | 12/1978 |
| RU | 2403455 | 9/1995 |
| RU | 2060610 | 5/1996 |
| SU | 1312130 | 5/1987 |

* cited by examiner

*Primary Examiner*—Thomas B. Will
*Assistant Examiner*—Tara L. Mayo
(74) *Attorney, Agent, or Firm*—Kelly, Bauersfeld, Lowry & Kelley, LLP

(57) ABSTRACT

A foundation comprising one or more layers or mattresses of tires, and a fill material provided within and/or between tires of each of the mattresses. The fill material is preferably a relatively coarse aggregate and provides a porous bed having relatively high drainage capacity. The lowermost mattress is typically wrapped in a porous sheet such as a geofabric cloth which is designed to allow the passage of water across the lowermost mattress whilst preventing the ingress of relatively finer material into the fill material and which can otherwise lead to degeneration of the foundation. At least some of the tires typically also have an upper sidewall removed therefrom.

24 Claims, 27 Drawing Sheets

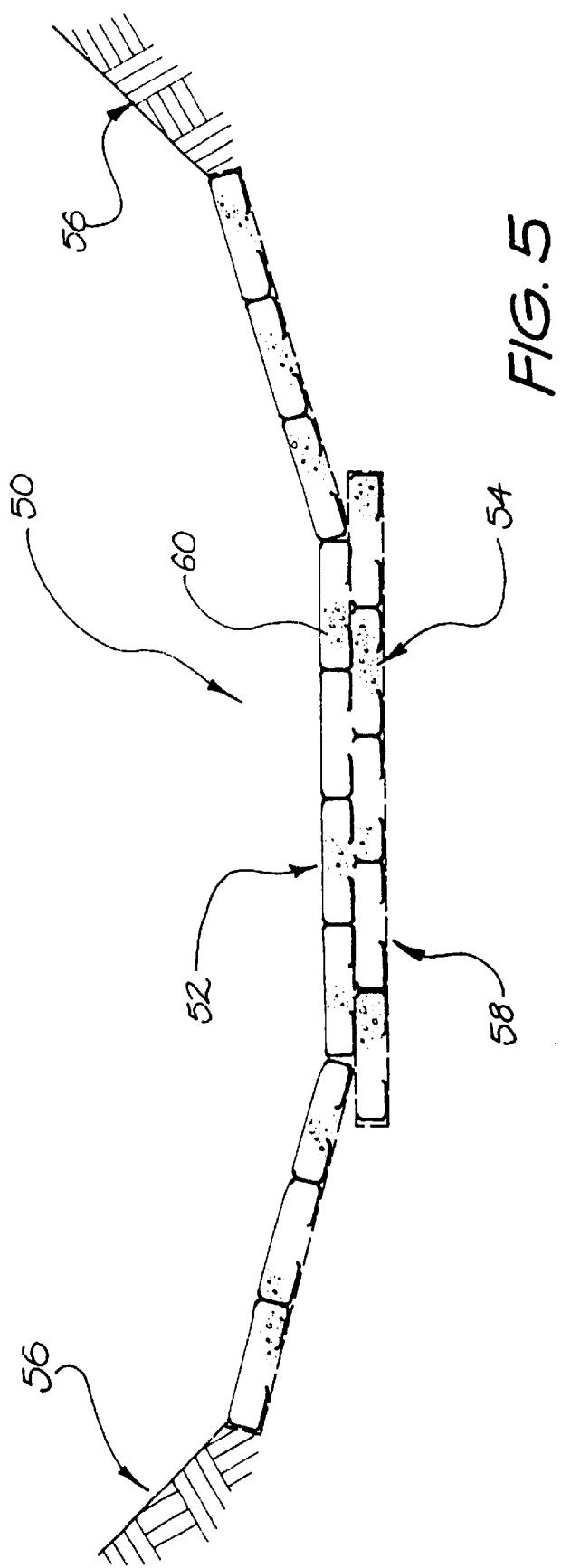

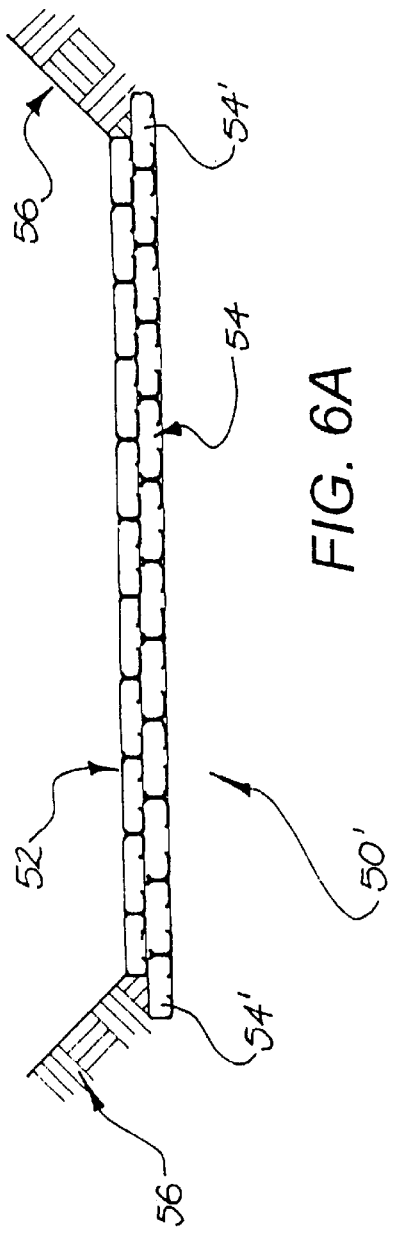
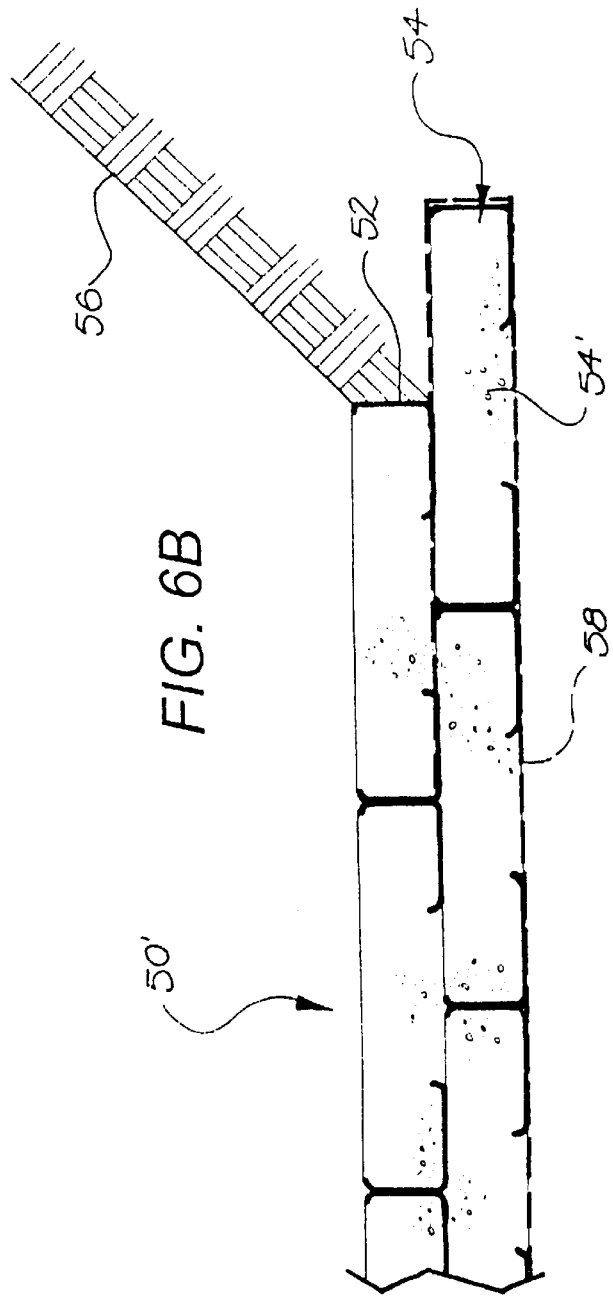

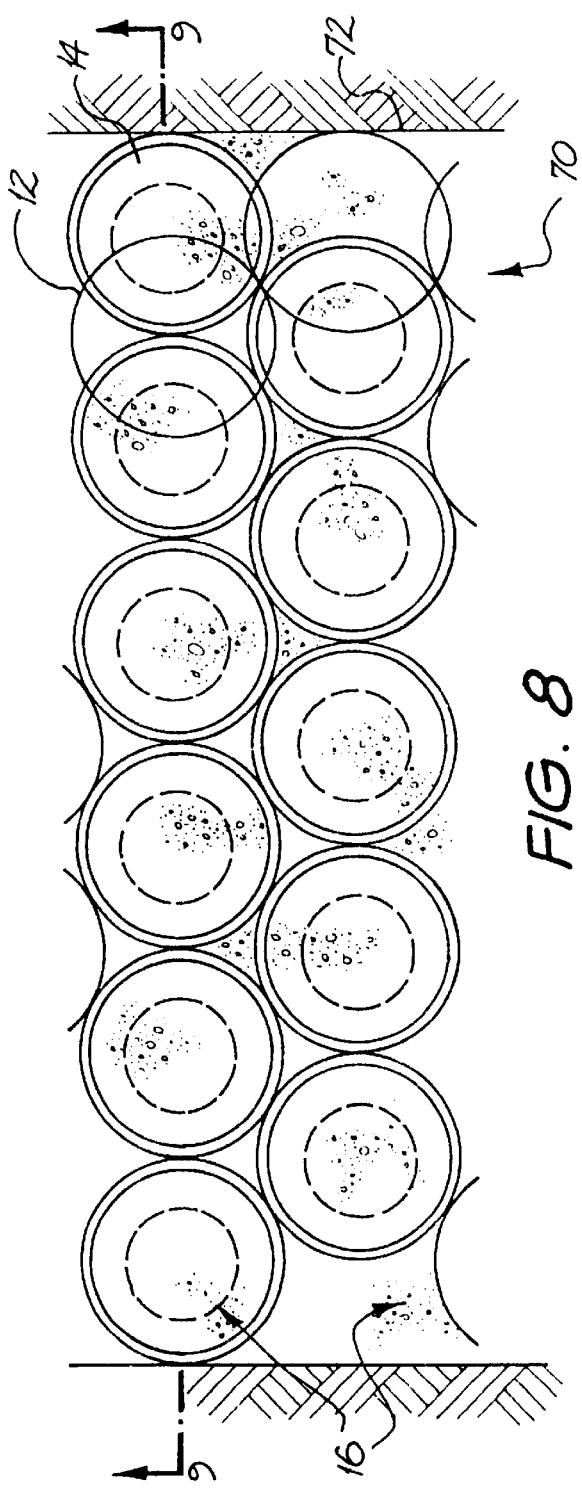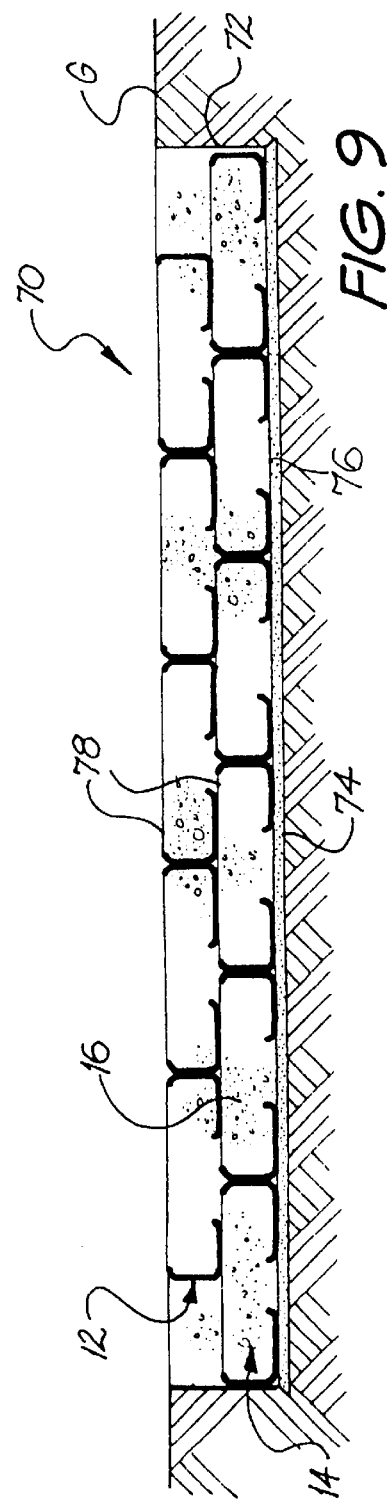

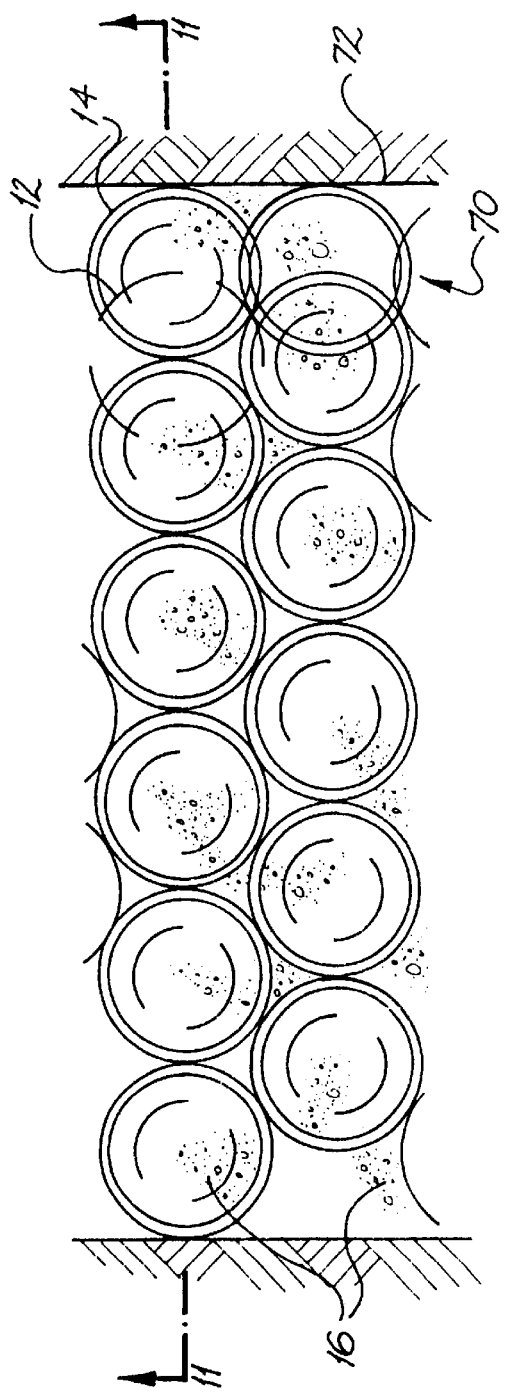
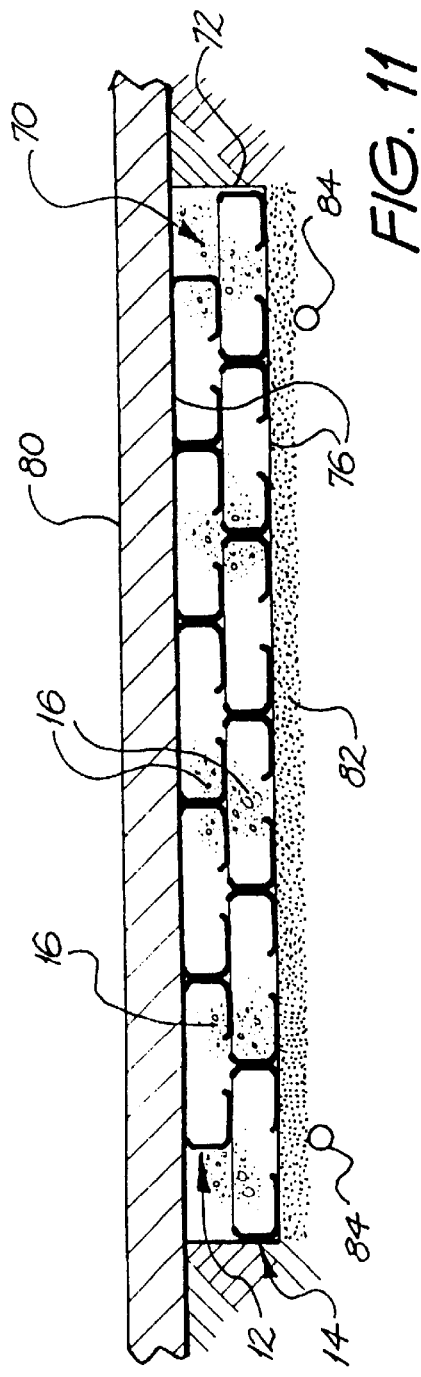

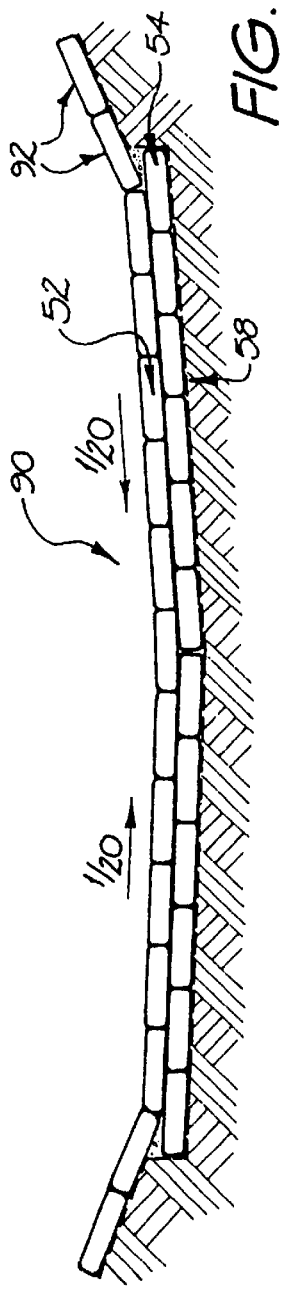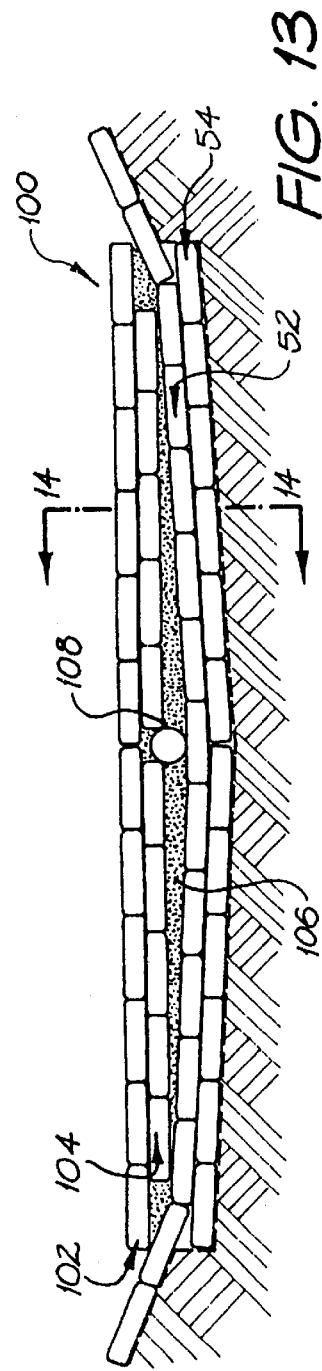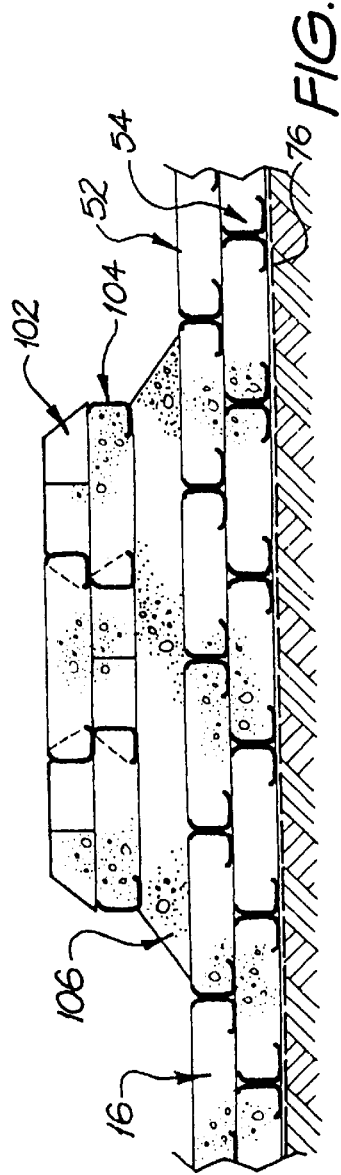

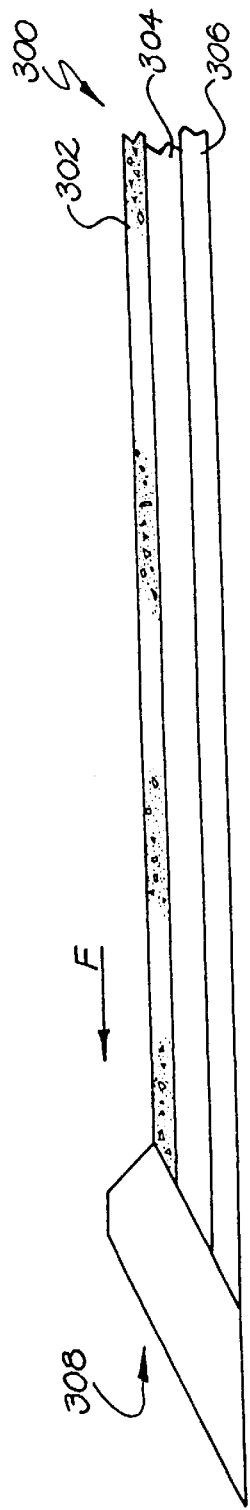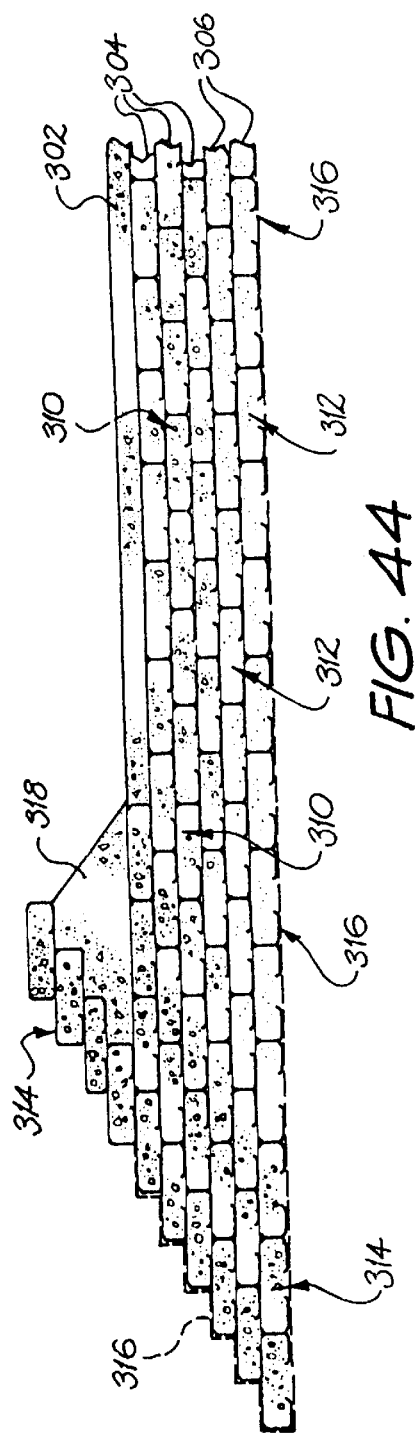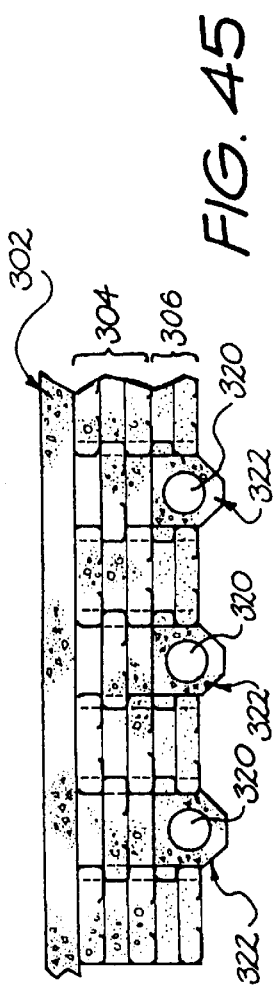

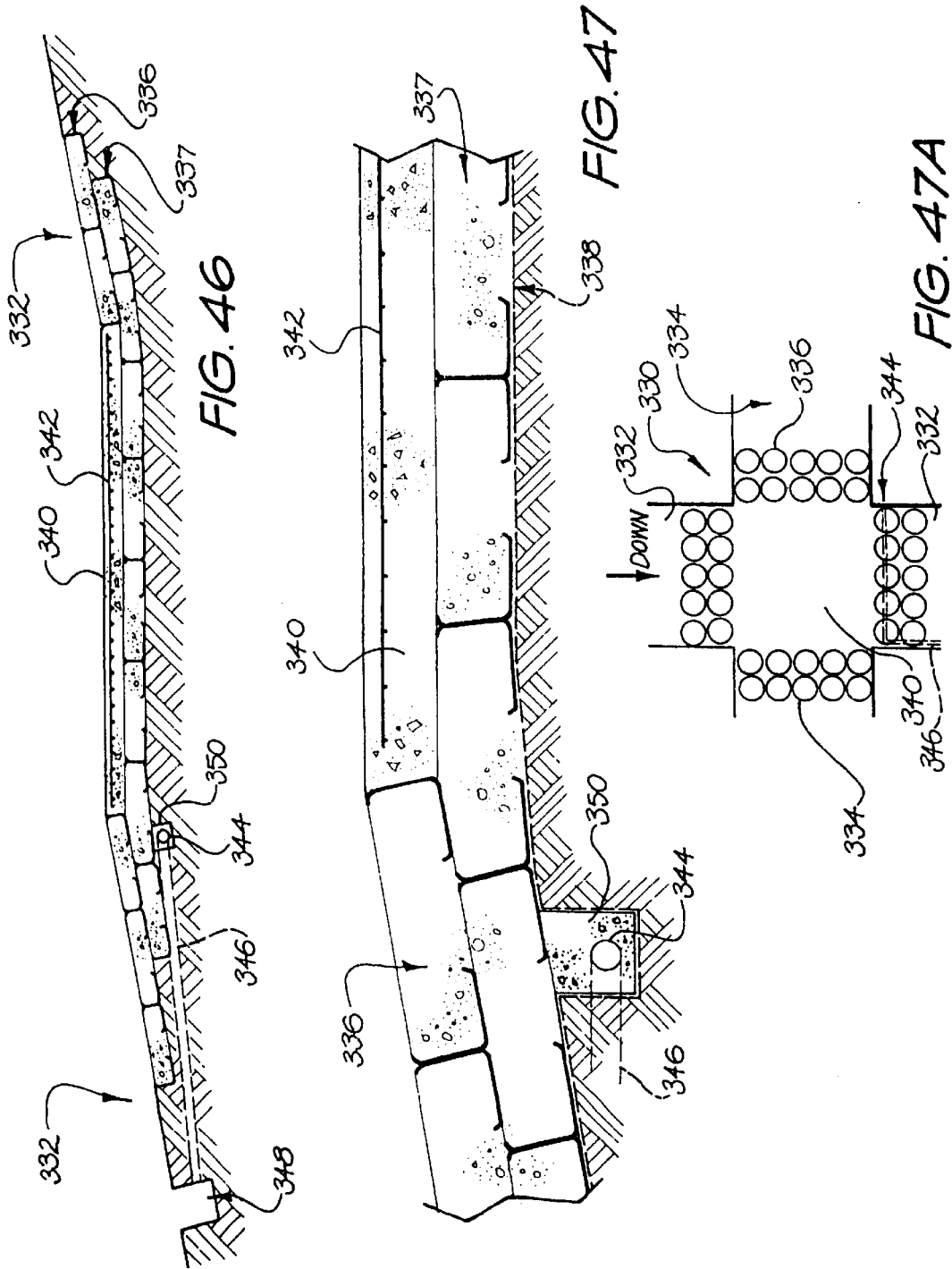

TIRE FOUNDATION STRUCTURE

RELATED APPLICATION

This is a continuation of U.S. patent application Ser. No. 09/762,524, filed May 17, 2001 now U.S. Pat. No. 6,533,501, which is a 371 of PCT/AU99/00640 filed Aug. 6, 1999.

FIELD OF THE INVENTION

The present invention relates to a foundation formed from one or more layers of tires. When the term "foundation" is used herein, it includes any weight bearing surface such as a roadway, building foundation, railway track base, etc and any causeway including drainage floors, flow channels, drainage pit base, water sump, trickle filter base, bank way (including wave mat banks in water break walls) etc. The term "foundation" is not intended to include retaining walls or the like (which are covered in the applicant's co-pending application WO 98/49400), although various retaining walls are disclosed herein.

BACKGROUND ART

The use of tires (especially used tires) in retaining walls and retaining slopes is known. AU 10006/95 suggests a use for old tires by providing a trench formed to accommodate the tires in a side by side position to form a drain, tunnel, duct, ventilation shaft or the like.

FR 2643400 discloses a surface stabiliser formed from tires set in straight lines and forming squares, with one tire at each corner of a square. Alternatively, the tires can be provided in staggered rows with adjacent tires forming triangles. The tires are bound together using natural synthetic fibres and can be filled with pieces of rock and covered, after laying, with rock or stones and a layer of soil to receive plants etc. However, FR 2643400 only discloses a single row of tires, and does not disclose any structures which would be suitable for use in high load or highly erosive environments.

Similarly, RU 2060610 discloses a terracing arrangement employing used tires in a staggered arrangement (FIG. 2 therein). Again, the arrangement disclosed in this document is not suitable for use in high load or highly erosive environments, but is concerned with providing a simple mat-type structure to prevent land erosion from rain.

NL 7706564 discloses a mattress for reinforcing an underwater structure. A plastic fabric has tires secured thereto and a weighting material (a coarse rock) is positioned in those tires. In such an arrangement, the coarse material is highly susceptible to ingress of fines material and thus breakdown. In addition, the tires are simply provided to carry the weighting material so as to hold the plastics underlay in position. The arrangement is not concerned with load bearing applications.

SU 1312130 discloses a slope covering formed from old car tires. The structure includes a protective earth layer reinforced with used tires over which a stone material reinforcement layer, also reinforced with used tires, is laid. Junction elements are provided between the tire layers to join the two together. In addition, a polymer screen to prevent the earth layer from being leached from the structure is provided, but again there is nothing to suggest any substantial anti-erosive performance or load bearing capacity.

RU 2043455 discloses a road bed construction method which involves forming a mat of tires which are secured in the lengthwise direction. The tires are connected at their treads, are then covered with earth, peat or sand and are then covered with a geotextile layer. However, the construction does not prevent the ingress of fine materials into the mat, and thus would deteriorate over time.

U.S. Pat. No. 5,823,711 discloses a water drainage system formed from scrap tires. The system is designed to collect water therein for pumpout at a later stage. In this regard, a water impervious layer is positioned under the tires to capture/trap water within the tires.

SUMMARY OF THE INVENTION

In a first aspect the present invention provides a foundation comprising one or more layers of tires including a lowermost layer being located adjacent to the ground on a porous geofabric material, with tires in the lowermost layer having an upper sidewall removed therefrom and being provided therewithin with a fill material having a preselected grade, wherein the lowermost layer is enclosed within the geofabric material, and further fill material having a preselected grade and/or one or more further layers of tires overlay the enclosed lowermost layer to define the foundation.

By removing upper sidewalls from tires within the lowermost layer, fill material can be compacted therewithin, and then by enclosing the lowermost layer within a porous geofabric material an anchor for the foundation can be provided which is free-draining.

Preferably, the geofabric material is adapted for allowing the passage of water through the lowermost layer whilst preventing the ingress of matter of a grade finer than the fill material into the lowermost layer. This prevents deterioration of the fill material within the layer by the ingress of finer surrounding material.

The present invention also provides a method of construction on ground of a foundation as defined in the first aspect including the steps of:

positioning on the ground the geofabric material;

locating the lowermost layer of tires on the geofabric material;

filling tires in the lowermost layer with the fill material; and folding the geofabric material to enclose the lowermost layer within the geofabric material.

Preferably the method includes a further step of overlaying the enclosed lowermost layer with the further fill material and/or the one or more further layers of tires.

Foundations constructed in accordance with the present invention can be suitably employed on: roads; ground or sub base such as sand and wetlands; drainage ways, courses and channels; railway track bases; mining tunnels; ramps and slopes adjacent to lakes, rivers, creeks, oceans; wave dissipation and breakwater walls; waste cell pits; stockpile bases; pavements; silt traps etc. All such environments are susceptible to erosion and deterioration through water saturation, and previous barriers employed.

In the foundation and the method of constructing the same, it is preferred that the tires within each of the layers are laid generally horizontally and are located adjacent to one another in a fixed array, each of the layers in conjunction with the fill material forming a tire mattress. Such a "mattress" construction provides a very stable foundation base and tends to resist erosion and provide high load bearing capacity.

Preferably each tire in each layer has a sidewall removed therefrom so that the tires can be oriented to be generally upwardly open in use to receive the fill material therein. When each tire is open (having its uppermost sidewall removed therefrom) fill can be readily compacted in each tire and an extremely stable and strong foundation can be constructed.

Typically the fill material is a rock aggregate or cobble of a relatively coarse grade. Such fill can be susceptible to dislocation and movement in use if finer material (such as sand) penetrates into the foundation structure. This is because the fine material "lubricates" the rock and reduces the interlock between aggregate pieces.

The number of layers employed in the foundation typically depends on the anticipated loadings and required stability of the foundation (eg when it is employed as an underlying road, ground or sub-base).

Typically, the lowermost layer is laid on the ground with minimal earthworks or sub-grade excavation being required. Advantageously, the foundation requires relatively low sub-grade stability and is thus suitable in marsh or swamp land and other wet areas. The layers of tires or tire mattresses can also be offset with respect to adjacent layers to provide distribution of the load between adjacent tires whilst reducing the stability (bearing pressure capacity) requirements of the underlying ground or sub-base (eg. one tire in one layer can overlay up to four tires in an underlying adjacent layer).

Preferably, the fill material is a rock aggregate or cobble of a relatively coarse grade. In one example, the rock aggregate fill is of a nominal 75 mm diameter. The relatively coarse fill material provides a porous layer having high drainage capacity. The relatively coarse fill material also combines with the tires to minimise degeneration of the roadway or the drainage floor.

The performance of the coarse grade fill can deteriorate if fine material ingresses into the foundation, thus providing another reason for the use of porous geofabric material. Dislocation and movement of the rock aggregate can lead to potholes in gravel roadways etc. Thus, the lowermost layer is wrapped in the geofabric material. In one example, the geofabric material is a geofabric cloth which also serves as a fire retardant.

When the foundation is used in a roadway or similar it can further comprise an edge support structure being configured to locate on opposing sides of at least an uppermost layer of the layers of tires, the support structure acting so as to inhibit movement of the tires and degeneration of the foundation. In one embodiment the edge support structure includes a row of support tires being located alongside and coupled via a link structure to at least one side of eg. the uppermost layer of tires.

Typically, the link structure includes a series of lateral tie elements each linking one of the support tires to an adjacent tire of the uppermost layer, and a longitudinal link element interconnecting the tie elements. In one example, the lateral tie elements and longitudinal link elements are constructed of tire tread connected end-to-end or alternatively of conveyor belt material. However, other alternatives are also possible (detailed below).

The foundation can also comprise a series of drainage tires located adjacent to one another within a trench excavated underneath the lowermost layer of tires, and a drainage fill material can be provided within or between the drainage tires. One or more drainage channels can extend from the trench so as to drain water away from the roadway or the drainage floor.

Typically the tires employed as the basic constructional element have intact tread portions (i.e. a whole tire is typically used, except that it typically has an upper side wall removed therefrom. However, in some applications such as in drainage channels, silt traps etc, part tires may be employed. For example, half a tire having an upper side wall removed therefrom can be employed, and various other tire segments can be employed.

In addition, tires within the foundation can be further strengthened by arranging tire portions therewithin as additional reinforcement. For example, in addition to fill material, a tire with an upper sidewall removed therefrom can have one or more coiled tire treads arranged therewithin, or a stack of tire sidewalls arranged therewithin, or combinations thereof etc.

Silt trap foundations in accordance with the present invention can be formed by arranging lengthwise a single row of tires, and by wrapping the row with tire tread or conveyor belt to form an integrated and portable unit. Preferably such units have three tires arranged end-to-end, each tire having an upper sidewall removed therefrom, with tire tread or conveyor belt extending around and joined to the tires.

BRIEF DESCRIPTION OF THE DRAWINGS

In order to achieve a better understanding of the nature of the present invention several preferred embodiments of different foundation structures in accordance with the invention will now be described, together with construction methods therefor, by way of example only, with reference to the accompanying drawings in which:

FIG. 5 is a sectional view of one embodiment of a drainage floor of the invention;

FIG. 6A is a sectional view of another embodiment of a drainage floor of the invention and FIG. 6B is an enlarged sectional detail of the embodiment of FIG. 6A;

FIGS. 8 and 9, show respectively, plan and sectional side elevations (taken on the line 9—9 of FIG. 8) of a double layer tire reinforced pavement;

FIGS. 10 and 11 show views similar to those of FIGS. 8 and 9, but where the double layers form the sub-base of a stockpile pavement;

FIG. 12 shows a sectional elevation through a flow channel, being similar to the drainage floor shown in FIGS. 5 and 6;

FIGS. 13 and 14 show, respectively, end and side sectional elevations through a flow channel incorporating a weir and silt barrier therein, with FIG. 14 showing a view taken on the line 14—14 of FIG. 13;

FIGS. 18, 19 and 20 show side, partial plan and sectional side elevations, respectively, (FIG. 19 taken on the line 19—19 of FIG. 18) of a trickle filter foundation for a stockpile of material or the like;

FIG. 23 to 27 show various views of a waste disposal foundation in accordance with the invention wherein FIG. 23 shows a plan view of one cell of the waste disposal foundation;

FIG. 24 shows a schematic plan detail of the cell showing an arrangement of tires therein;

FIG. 25 shows a cross sectional side view through the cell of FIG. 23;

FIG. 26 shows a side elevation of part of the distribution channel shown in FIG. 24;

FIG. 27 shows a side cross-sectional view taken on the line 27—27 of FIG. 26;

FIG. 43 shows a side elevation of a causeway structure foundation, with FIG. 44 showing the same elevation in cross section, and FIG. 45 showing a cross section through part of the causeway, illustrating a drainage configuration;

FIG. 46 shows in side elevation an alternative roadway and drainage foundation structure, and FIGS. 47 and 47A show respectively a detail and plan view of the arrangement of FIG. 46;

MODES FOR CARRYING OUT THE INVENTION

Figure 1:
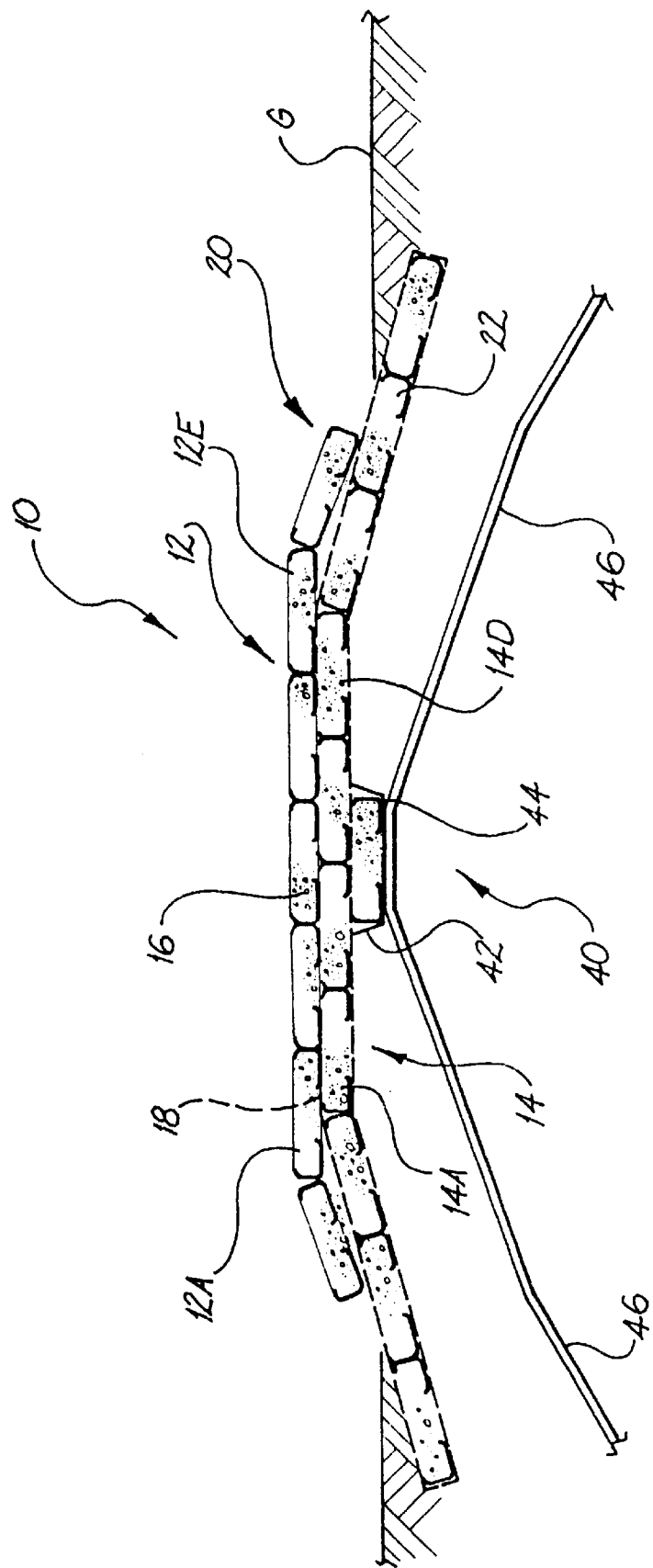
FIG. 1 is a sectional view of a roadway according to one embodiment of the invention.
Figure 2:
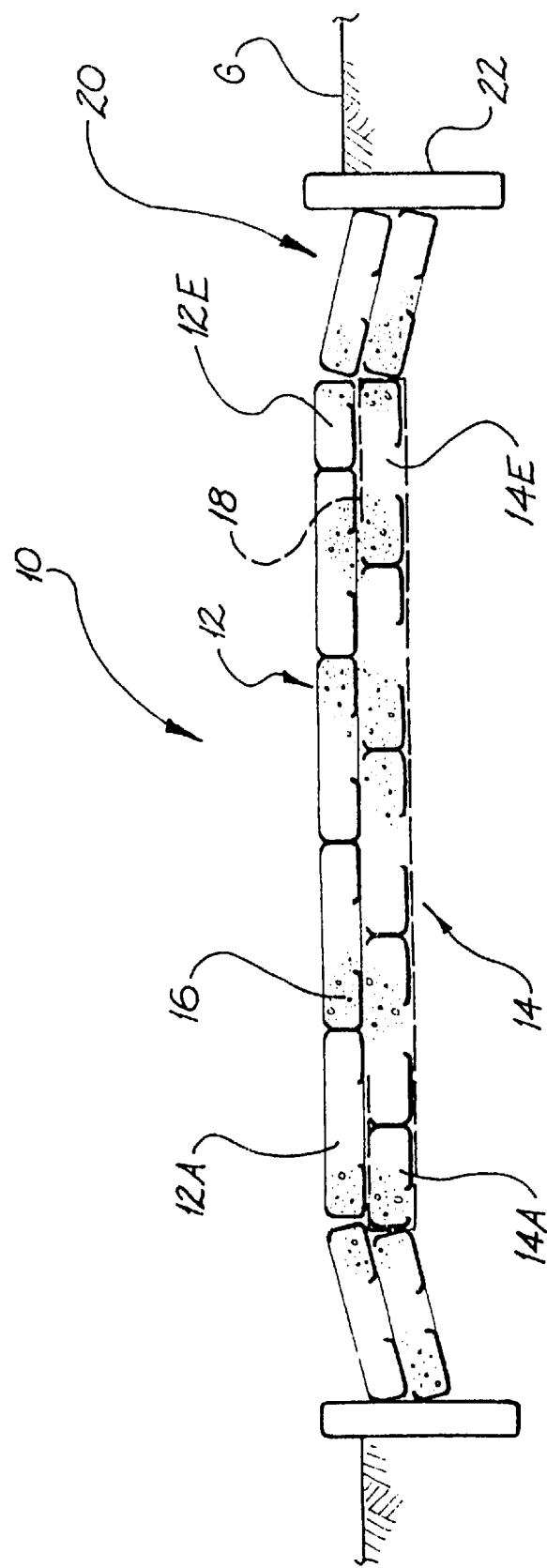
FIG. 2 is a schematic sectional view of another embodiment of a roadway of the invention.

As shown in FIGS. 1 and 2 a foundation in the form of a roadway comprises two layers of tires or tire mattresses resting upon one another. Each mattress 12, 14 includes an array of tires such as 12A to 12E and 14A to 14D. Tires of the upper and lower mattresses 12 and 14 are typically offset relative to each other so as to distribute the load with each of the tires being laid horizontally. The various offset arrangements that can be adopted can be appreciated by considering, for example FIGS. 7, 8 and 10. Thus one tire in one mattress can be supported by up to four tires in an adjacent underlying mattress. This substantially improves load distribution over previous arrangements.

The upper and lower tire mattresses 12 and 14 are in-filled with a fill material indicated as 16. The fill material 16 is preferably a rock aggregate or cobble having a nominal 75 mm diameter. Thus, the relatively coarse fill material 16 forms a porous bed typically both within and between adjacent tires such as 12A to 12E and 14A to 14D thereby providing a rock aggregate bed with a high drainage and yet a high load capacity. Furthermore, the relatively coarse fill material 16 combines with the tire mattresses 12, 14 to provide a strong and stable structure, thereby minimising degeneration of the roadway 10.

At least some of the tires in at least one of the layers have a sidewall removed therefrom (or have an equivalent structure which is akin to removing a sidewall—(see eg the tire arrangements of FIGS. 28 to 30)). Typically most or all of the tires have a sidewall removed therefrom, and the tires are positioned in the roadway so that the remaining sidewall faces downwardly (as better shown in eg FIG. 9). By removing the tire sidewall (or providing an equivalent structure) the fill material can be compacted within the tire (tires that have both sidewalls intact cannot be filled and compacted to anywhere near the same extent). Thus, each such tire functions something like an anchor within the foundation in which it is arranged, and this greatly enhances the strength and stability and minimises degeneration of the foundation over time.

Typically at least the lower tire mattress 14 is wrapped in a porous sheet 18 such as a geofabric cloth. The geofabric cloth 18 is designed and selected to allow the passage of water across the lower mattress 14 whilst preventing the ingress of relatively fine material into the gravel bed of the lower mattress 14. If fines "contaminate" the gravel bed 16 this accelerates degeneration of the roadway 10 as evidenced by formation of potholes in conventional gravel roadways. The geofabric cloth 18 in the roadway construction can also serve as a fire retardant. The upper tire mattress 12 in this embodiment is not covered in a geofabric cloth. Typically the cloth is wrapped right around the mattress with the free ends being lapped over the upward facing mattress surface after wrapping. The next mattress is then layered over those lapped ends to fasten the cloth around the mattress (and so on—as required).

The roadway 10 also includes an edge support structure 20, which is constructed from in-filled tires. The edge support structure is located on opposing sides of the upper and lower tire mattresses 12 and 14. The roadways of FIGS. 1 and 2 incorporate two variations of the support structure 20 each using tires 22 at least partly buried below ground level G. However, the edge support tires 22 may also be located within a trench excavated alongside the roadway 10. The support structure 20 of FIG. 1 includes edge support tires 22 oriented in an inclined plane whereas the support structure 20' of FIG. 2 includes a vertically oriented series of tires 22 forming an outermost boundary to the roadway 10.

FIGS. 3, 4 and 37 to 42 illustrate other forms of edge support structures 26 to those described above. These alternative support structures 26 can comprise a row of support tires 28 each located alongside and forming a boundary to the sides of the upper and/or lower tire mattresses 12 or 14. A link structure shown generally as 30 includes one or a series of lateral tie elements 32 having one end connected to a longitudinal link element 34 or fastening arrangement 35 (FIGS. 37 to 39) both of which in turn connect the tie elements to the tire rows 28. The tie elements 32 can engage (by being under and/or being fastened to) the upper or lower tire mattress 12 or 14 to couple the mattress 12 or 14 to the link structures 30. Support structure 26 is effective in inhibiting movement of the tire mattresses 12 and 14 which might in some circumstances lead to degeneration of the gravel bed 16 and roadway 10.

Figure 3:
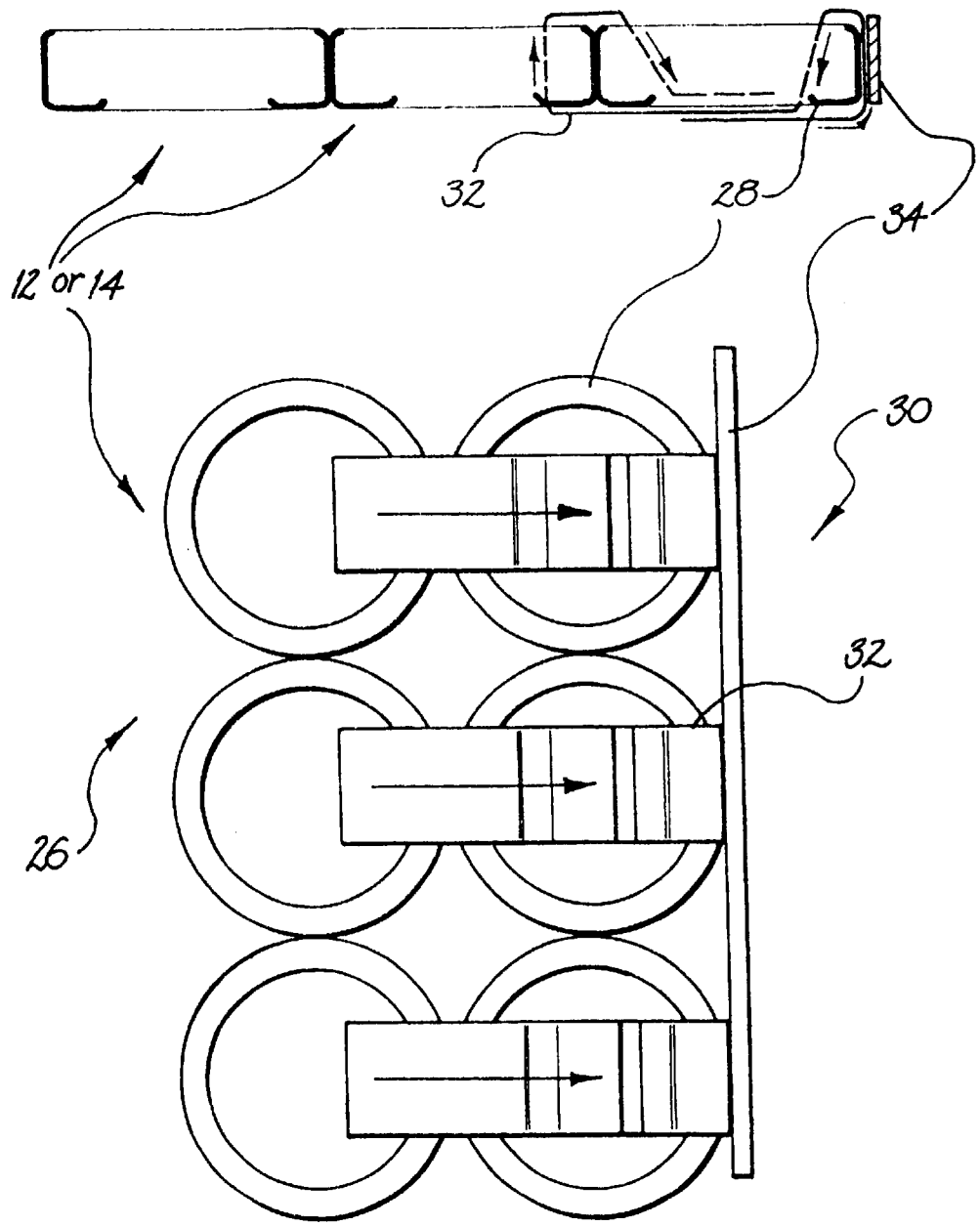
FIG. 3 shows a plan view and a schematic sectional view of an edge support structure for use with the roadway of FIG. 1.
Figure 4:
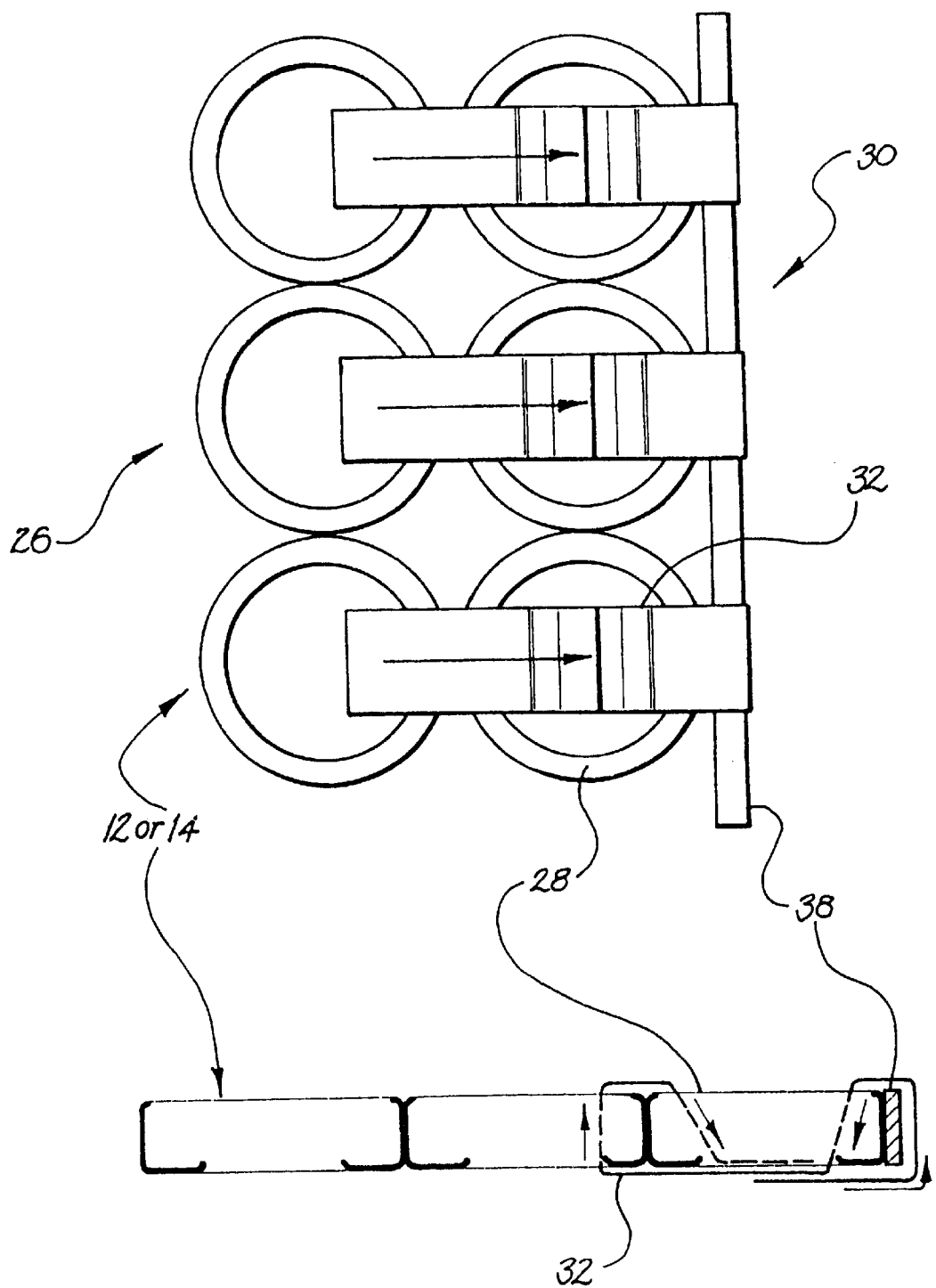
FIG. 4 shows a plan view and a schematic sectional view of an alternative edge support structure.
Figure 41:
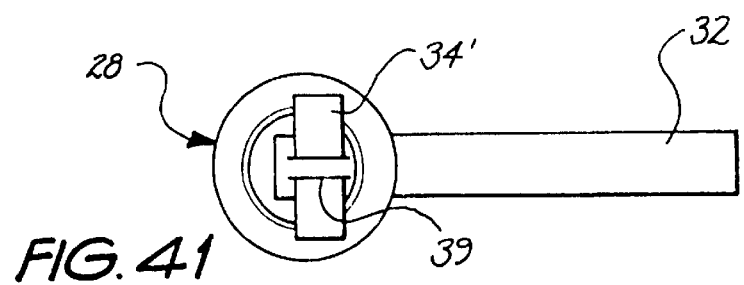

In the support structure arrangements depicted in FIGS. 3 and 4, the lateral tie elements 32 each consist of a length of tire tread or conveyor belt underlying both the boundary tires of the tire mattress 12 or 14 and the support tires 28, and being wrapped around these abutting tires in a figure of eight arrangement as crudely illustrated by the arrows of FIGS. 3 and 4. The longitudinal link element 34 consists of another length of tire tread or conveyor belt having a pair of opposing longitudinal cuts 39(as shown in FIG. 41) which together define a slot through which one of the lateral tie elements 32 is passed prior to wrapping of the tie element 32 around the abutting tires. The lengths of tire tread are formed from one or a series of tire treads or conveyor belts joined end to end.

The tire treads can be formed from recycled tires having both of their sidewalls cut away whereas typically the conveyor belts are unmodified discarded belts. It will be appreciated that the in-fill material, most generally rock aggregate, within the support tires 28 serves to lock the tie element 32 back onto itself so as to rigidly anchor the support structure adjacent to the upper and/or lower mattresses 12 or 14. The link structure 30 of FIG. 4 can further (or alternatively) include a recycled concrete beam 38' in place of a length of belt or tread.

Referring to FIGS. 37 to 42, alternative link structures 26 are depicted.

Figure 37:
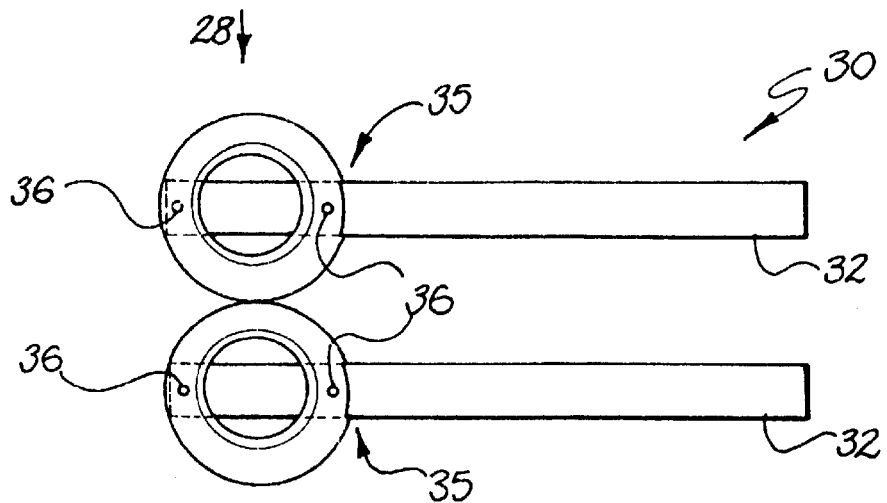
FIGS. 37 to 42 show alternative edge support structures for use with a roadway or other foundation, being alternatives to those structures shown in FIGS. 3 and 4.

In FIG. 37, the fastening arrangement 35 includes a pair of fastening pins 36 for attaching tire or belt tie elements 32 to each tire in row 28. Typically the pins are fastened to the tire lower sidewall and can be, for example, bolts, rivets, metallic ties, etc.

Figure 38:
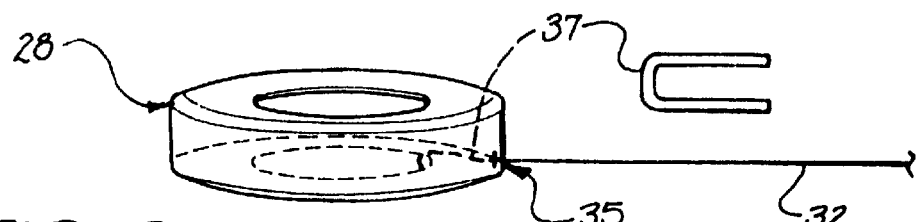

FIG. 38 shows an alternative mechanism for attaching tie element 32 to tire 28. In this case, a clamp 37 is fastened around element 32 and the tire lower sidewall (as depicted). The tie element can be looped up through the lower opening of the tire and doubled back, and a clamp can then be clamped around that looped end of the tie element, sandwiching the tire lower sidewall therebetween. Typically the clamp is preformed from a deformable metallic material which is typically also corrosion resistant.

Figure 39:
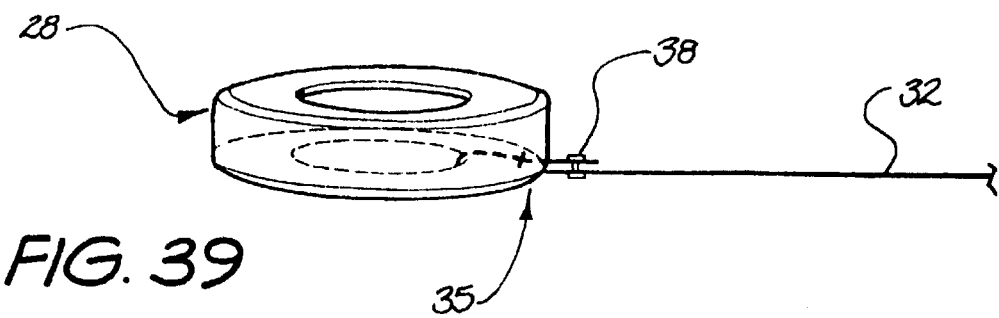

FIG. 39 shows a similar arrangement to FIG. 38, but in this case the tie element is looped up through the tire lower opening and back over the tire lower sidewall, and then out of the tire through an appropriate slit preformed in the tread section thereof. The free end of the tie element is then optionally fastened back onto the tie element via a bolt or pin fastening 38.

Figure 40:
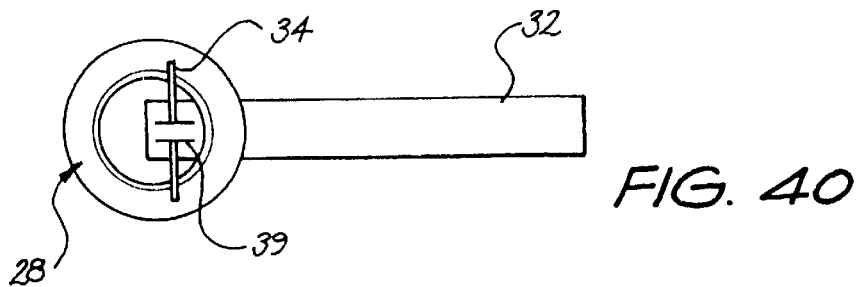

FIG. 40 shows an arrangement somewhat similar to that shown in FIGS. 3 and 4, but in this case the free end of tie element 32 is passed up and right through the tire. A pair of longitudinal slits 39 are formed in the free end of tie element 32, and a rod 34 (eg. a corrosion resistant metal rod, a concrete pillar etc) is slotted therethrough. In use the weight of fill material then maintains the rod in position.

FIG. 41 shows a similar arrangement to FIG. 40, but in this case the rod 34 is replaced by a length of tire or belt tread 34'.

Figure 42:
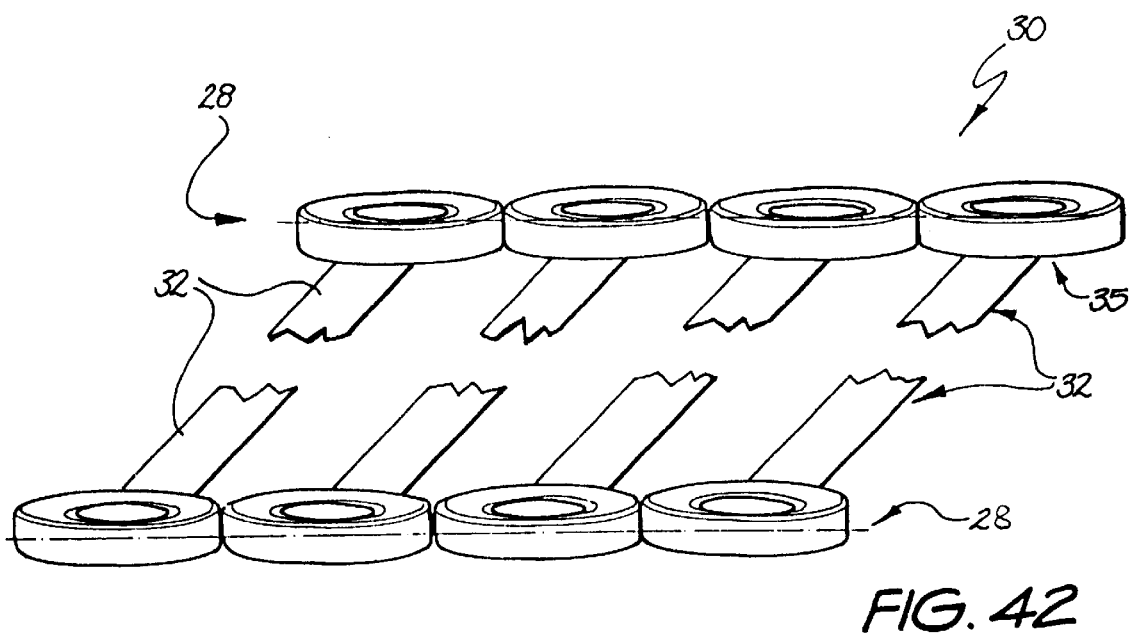

In FIG. 42, it can be seen that each tie element can extend right across the roadway, and under either or both of mattress 12 and mattress 14. This further enhances the structural stability and integrity of the roadway.

FIG. 1 also illustrates a drainage system shown generally as 40 which may be used in conjunction with the roadway 10. The drainage system 40 includes a trench 42 pre-excavated under the lower tire mattress 14, a series of drainage tires 44 being located adjacent to one another within the trench 42. The trench 42 and tires 44 are in-filled with the fill material such as 75 mm rock aggregate. Alternatively, the trench 42 may include the rock aggregate fill material only without relying on drainage tires. A number of drainage channels 46 spaced longitudinally along the roadway 10 extend away from the trench 42 so as to drain water within the trench 42 away from the roadway 10. The roadway 10 typically includes a 1% camber or transverse run-off to further assist in water drainage.

Figure 7:
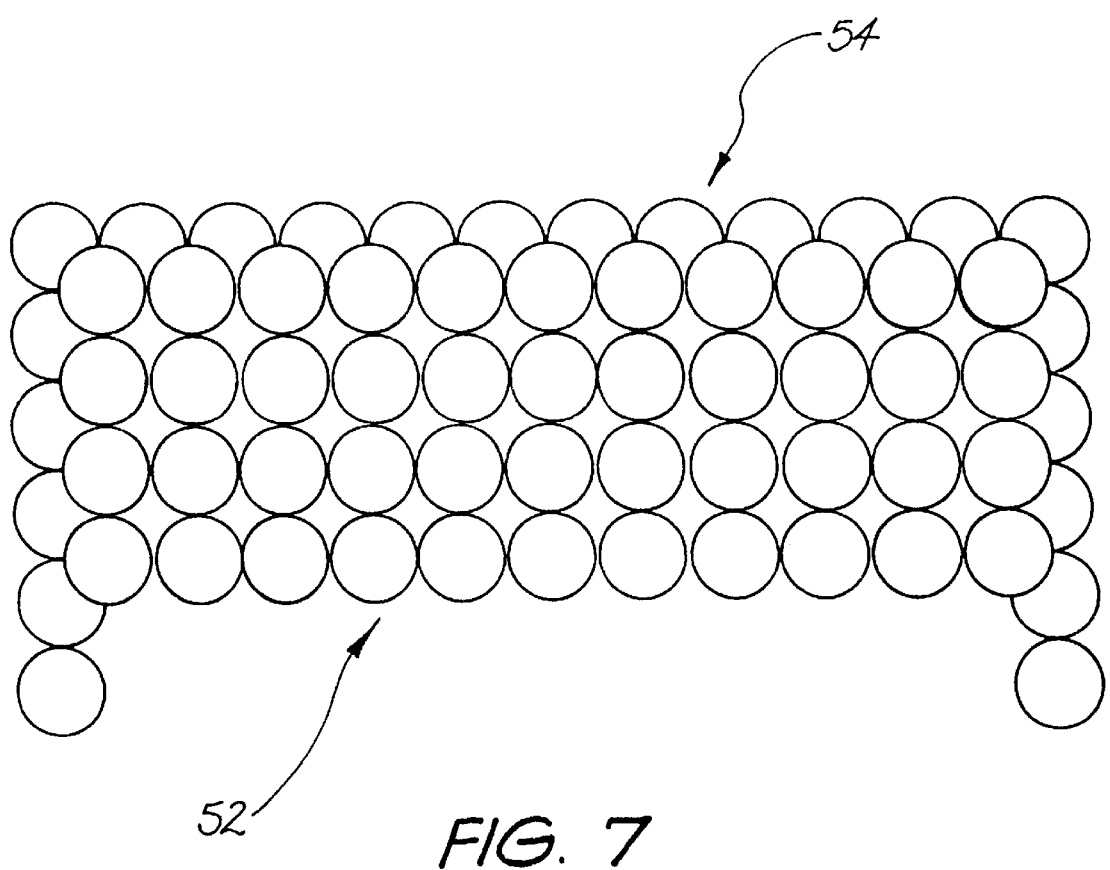
FIG. 7 is a plan view of part of the drainage floor of FIG. 6.

In a further embodiment of the invention the foundation can be provided in the form of a drainage floor, shown generally as 50 in FIGS. 5 to 7. The drainage floor 50 is similar in construction to the roadway 10 described above, being formed as a two layer tire mattress 52, 54. Mattress 52 however, can continue someway up sidewalls of a trench or canal 56 in which the floor is located (eg. providing sufficient coverage for extra fluid flow therewithin) The drainage floor 50 when located within the trench or canal 56 is thus supported on the boundary walls of the trench or canal and as a result, the drainage floor does not require an edge support structure as incorporated in the roadway 10 described above. Otherwise, the drainage floor 50 is similar to the roadway 10 in its basic construction having the lower mattress 54 wrapped in a porous layer such as geofabric cloth 58. The upper and lower tire mattresses 52 and 54 are both in-filled with a fill material 60 preferably being a relatively coarse grade rock aggregate.

The drainage floor 50, although primarily designed for water drainage, may also be constructed so that it can function as a roadway. When serving the dual function of a drainage floor and roadway the drainage floor is designed with the necessary number of layers of tires or tire mattresses in order to adequately handle anticipated vehicle loadings. This will also be influenced by the inherent ground stability wherein additional tire mattresses may be used with unstable or saturated ground such as that experienced in marsh and swamp lands, or in high drainage flow areas.

FIGS. 5 to 7 illustrate two forms of drainage floors 50 and 50' being configured according to the shape of the trench or canal. In both examples, tires within the upper and lower mattresses 52 and 54 are offset or staggered relative to each other so as to most effectively distribute the load from the upper mattress to the lower mattress (see FIG. 7). As illustrated in some detail in FIG. 6 outermost tires 54' of the lower mattress 54 undercut the existing bank 56 of the trench or canal. This provides additional edge support to the upper and lower mattresses if required.

Referring now to FIGS. 8 and 9, a tire reinforced pavement 70, similar in construction to the roadway 10, is depicted (and like reference numerals will be used to denote similar or like parts). In forming the pavement 70, rather than locating the pavement on the ground, the ground is excavated to form a trench 72 in which the pavement is laid.

Typically, a 75 mm bed of sand 74 is deposited in the base of the trench after excavation to enable a fairly flat trench base to be provided and to minimise ingress to the trench of even finer particles. Geofabric 76 (or other porous sheet) is then laid on top of the sand bed, and tire mattress 14 is then laid on, in-filled and wrapped in the geofabric. Mattress 12 is then laid on wrapped mattress 14 and is in-filled typically with crushed stone 16 or cobble of 40 to 75 mm particle size to produce the finished pavement. During each in-filling step the fill material is preferably compacted to enhance stability, with tire open upper ends enabling enhanced compaction.

FIG. 9 (at 78) also illustrates how each tire upper sidewall has been removed, to enable the aggregate to completely fill up each tire and be compacted therein. In effect the tires act as a reinforcing within the aggregate and also enhance the overall dimensional stability of each mattress.

FIGS. 10 and 11 show a similar arrangement to FIGS. 8 and 9, but in this case the pavement 70 forms a sub-base for a stockpile pavement 80 (eg formed from a concrete or a porous layer). Like reference numerals are used to indicate similar or like parts to those shown in FIGS. 8 and 9.

Because the stockpile pavement is typically formed of a heavier and denser material (eg a 300 mm slab) and typically supports heavy loads, a coarse sand layer 82 (typically thicker than 75 mm) is provided in the base of trench 72. In addition, a pair of agricultural drains (typically of 100 mm diameter and slotted) are provided on either side of the trench for draining away any trapped water penetrating under the stockpile pavement.

Furthermore, because the stockpile pavement is typically laid over the pavement once it has been laid, geofabric 76 can also be provided to cover the upper tire mattress 12, thereby preventing the ingress of concrete into the pavement fill material.

Referring now to FIGS. 12 to 14, fluid flow channels (similar to the drainage floors of FIGS. 5 to 7) are depicted. Like numerals are used to denote similar or like parts.

FIG. 12 depicts a flow channel 90 formed from a two layer tire mattresses 52, 54, and laid over a geofabric base 58. Side tires 92 extend partway up the channel sloped bank and it can also be seen that the flow channel itself has a 1 in 20 slope into the centre thereof. This enables, for example, an agricultural drain to be positioned centrally within or under the mattresses to facilitate better drainage.

In FIGS. 13 and 14, the flow channel 90 can be provided with one or more intermediate weirs 100. Each weir includes tire upper mattress layer 102 and tire intermediate mattress layer 104. Furthermore, a silt barrier 106 can be provided between the upper mattress layers 102, 104 and lower mattress layers 52, 54.

The upper mattress layers 102 and 104 extend transversely across the top of the lower mattress layer 52, 54 for the width of the flow channel to provide, in conjunction with the silt layer, the weir formation. It is typically desirable to have a weir formation in a flow channel, or on a drainage floor etc to assist in regulating flow through the channel and/or to provide a barrier to trap entrained solids in fluid flowing through the channel.

The silt barrier can function to prevent any fines being transported in the fluid flowing through the channel from being deposited and ingressing into the lower layers 52, 54 (thereby ultimately leading to erosion). The weir formation can also allow for a low rate seepage of water across the weir (eg to provide a filtration type function). Typically the silt barrier is formed from gravel or crushed stone.

A drainage pipe 108 can also be provided in weir 100. The pipe 108 can function as a low fluid flow pipe that still allows fluid in the trapped silt bulk to pass through the weir. The pipe 108 can also be provided in the form of a slotted agricultural type drain enabling fluid seeping through the upper layers 102, 104 and the silt barrier 106 to drain away from the weir. The arrangement as described provides a very stable and erosion resistant construction for flow channels and floors.

Figure 15:
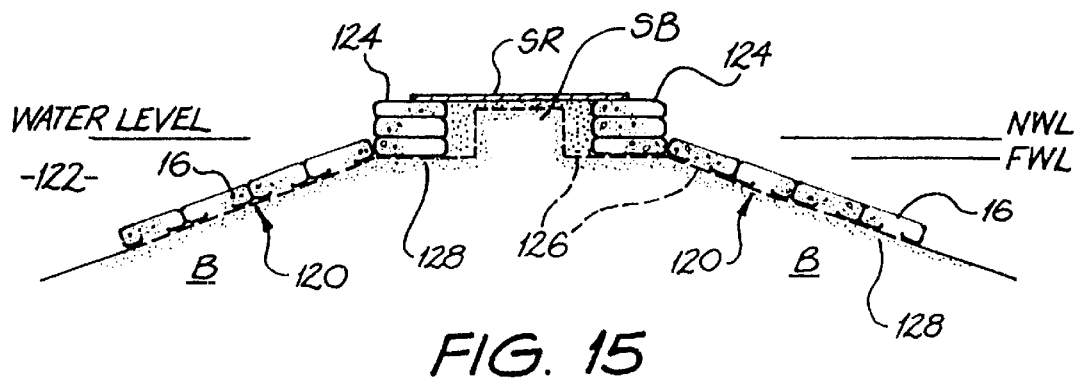
FIGS. 15 and 16 show in side elevation, alternative bank protection foundations (wave mats), with FIG. 15 showing an aquaculture pond configuration and FIG. 16 a wave mat at a retaining wall (such as a seawall)
Figure 16:
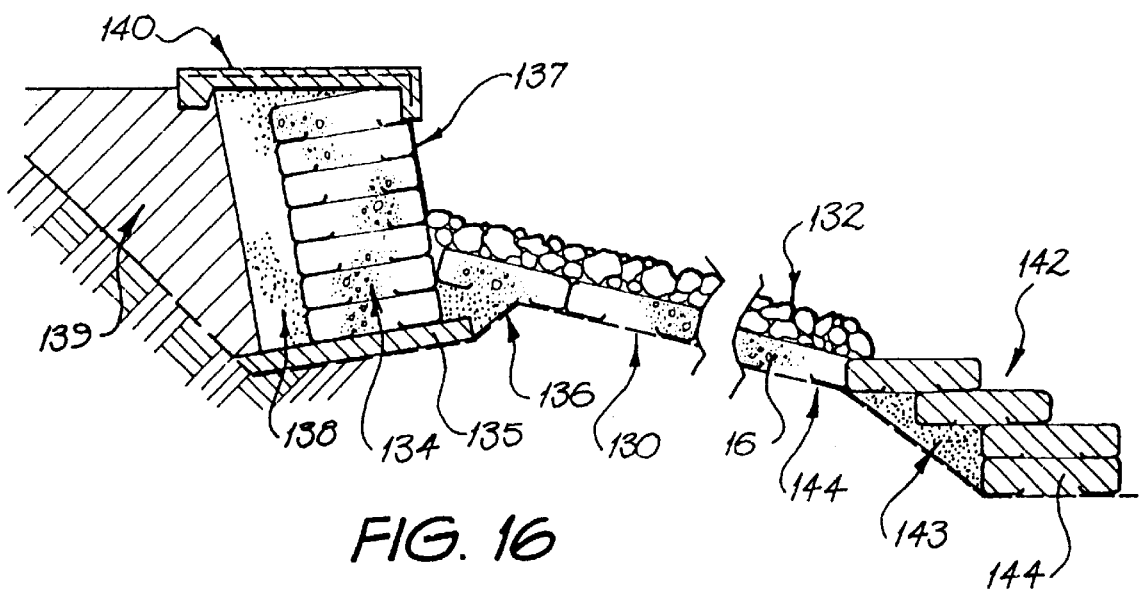
Figure 17:
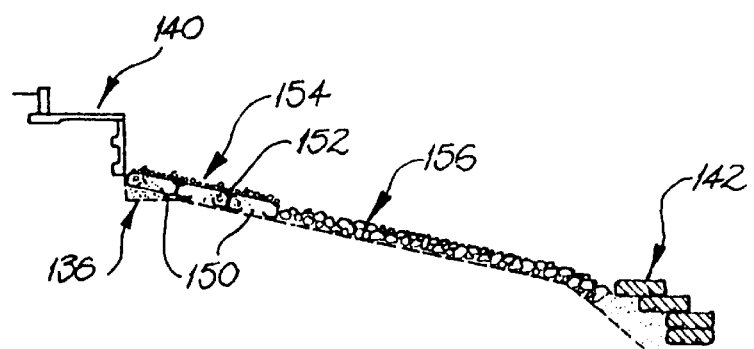
FIG. 17 shows a sectional elevation of an alternative wave mat arrangement for use with a retaining wall.
Figure 18:
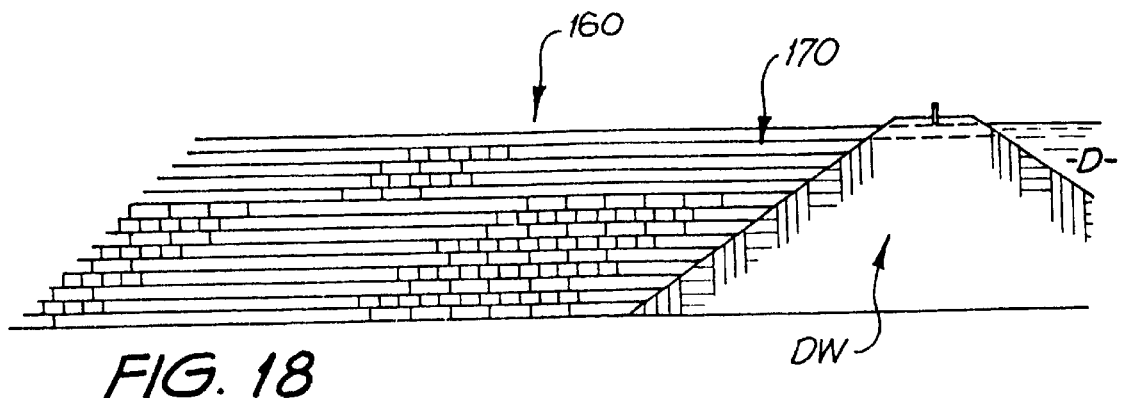

Referring now to FIGS. 15 to 17, three different types of wave mat configurations are depicted for preventing bank erosion and scouring at ponds, lakes, seawalls etc.

Referring to FIG. 15, a wave mat arrangement 120 for use in eg aquaculture pond 122 is depicted. The wave mat protects the bank B against erosion and scouring from water surge in the pond. The bank extends down and away from the pond service berm SB which typically has a service road SR located thereon. As can be seen, each bank of the service berm is provided with a retaining wall structure 124 on either side thereof and formed from tires (eg in accordance with the applicant's retaining wall construction techniques disclosed in WO 98/49400).

The wave mat includes a plurality of tires formed in rows progressively laid along the bank and extending down the bank. Typically each tire has a sidewall removed therefrom, and has aggregate material 16 compacted therein. Typically the tires in adjacent rows are joined to each other via ties or other mechanisms (eg as described in relation to FIGS. 31 to 36).

A geofabric layer 126 underlies the wave mats on either side of the berm, and in some applications it may also be prudent to form the wave mat and the berm on an aggregate base 128. As can be seen, the geofabric layer extends under both wave mats and also into and through the service berm. This enhances the overall stability of the wave mat construction. The layer also prevents the ingress of finer material into the wave mat (which would otherwise cause deterioration thereof over time).

FIG. 15 also shows that the aquaculture pond has a normal water level NWL and a flushing water level FWL. In other words, during use of the aquaculture pond, the water level changes and surges. The wave mat on either side of the service berm protects both the bank and the berm itself from erosion and scouring. The wave mat also absorbs the impact of the surging water, and this absorptive capacity is increased by the presence of the resilient tires within the wave mat.

FIG. 16 shows a retaining wall and wave mat construction for a seawall or lakewall, where water forces are likely to be significantly greater than in an aquaculture pond. The wave mat 130 is, similarly to the aquaculture pond, formed from a plurality of tires formed in rows and in-filled with an aggregate material 16. To enhance the stability and erosion resistance of the wave mat, a rock layer 132 (eg 250 mm thick) is positioned over the wave mat and provides sacrificial wear resistance, with the wave mat providing impact resistance and enhancing wave absorption capacity. The layer 132 can be sprayed over with a spray concrete to enhance unity and strength thereof.

The wave mat can be used in conjunction with a tire retaining wall 134 (eg formed in accordance with the techniques of the applicant disclosed in PCT/AU98/00302). That retaining wall sits on a base 135 of coarse fill material and between the base and the wave mat, a gravel fill layer 136 is provided.

The retaining wall includes a jacroc cover 137, a gravel infill backing layer 138, and a compacted backfill composite material layer 139. A concrete capping 140 (which can provide a walkway, a driveway etc) is positioned on top of the retaining wall. The lower end of the wave mat is provided with a number of stacks of tires 142, which are typically infilled with either a denser compact fill material or concrete (to provide an anchor function). A gravel backfill layer 143 is provided behind tire stack 142. Again, it is preferred that a geofabric layer 144 is laid under the wave mat 130 and tire stack 142 to enhance the stability of the overall structure and to prevent the ingress of relatively finer material into the various fill materials employed in and between the tires.

The wave mat arrangement of FIG. 16 is more complex and more highly reinforced than that depicted in FIG. 15, to cope with the greater and more consistent/frequent wave forces applied at sea retaining walls.

Referring now to FIG. 17, a wave mat arrangement similar to that shown in FIG. 16 is depicted and like reference numerals will be used to denote similar or like parts. In the wave mat of FIG. 17, only the upper portion thereof is formed from filled tires (at region 150). Typically the tires in that region are packed with 150–250 mm rock aggregate 152 (and typically the top two rows are in turn typically then grouted therein with a mortar or concrete-type grouting). A rock layer 154 is then placed over the wave mat (eg formed from 40 mm rock, typically 100 mm thick). The remainder of the wave mat is defined by a rock protection section 156, which is positioned between the wave mat section 150 and the tire stack 142. This section is stabilised by the location of the tire stack and tire wave mat on either side thereof, and again a very stable structure results.

Figure 19:
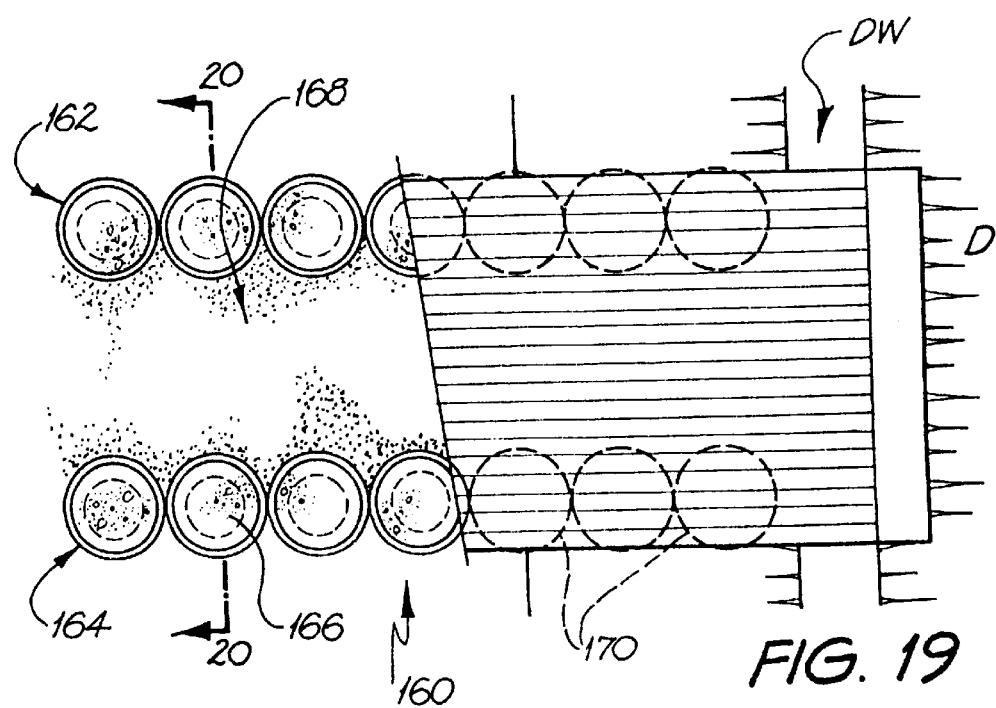
Figure 20:
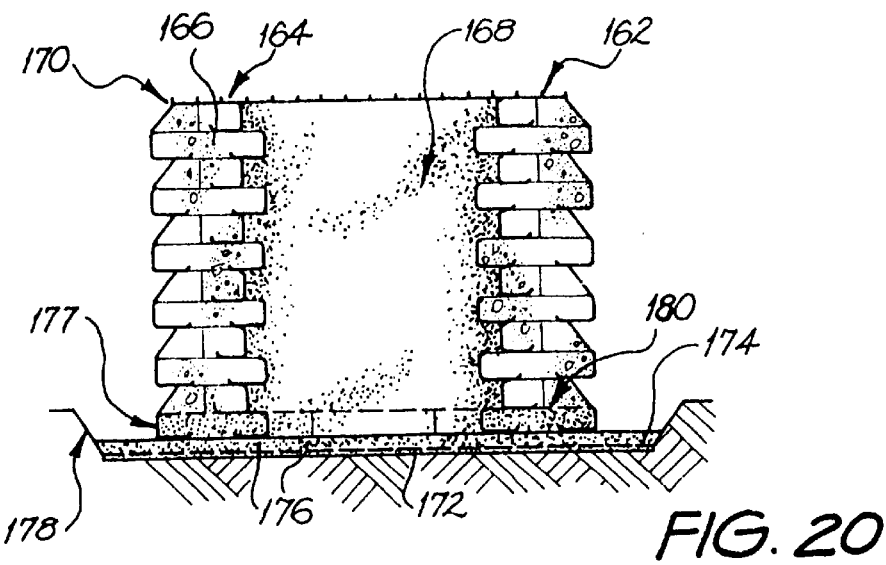

Referring now to FIGS. 18 to 21, a foundation in the form of a trickle filter construction 160 for stockpiles such as coal etc is depicted. For stockpiles requiring spraying with a fluid (eg. such as coal stockpiles) the construction can be located on the lee side of a dam wall DW of dam D. FIGS. 19 and 20 show how the trickle filter construction has opposing sidewalls formed from a plurality of stacked tire rows 162, 164. Each tire is infilled with a sand or chitter fill material 166 (chitter being a coal by-product). Typically the same fill material 168 is then deposited between the tire rows. The tire rows support an overlying condeck distributor trough 170 (or other folded metal trough) which provides a stable platform for the stockpile.

Referring specifically to FIG. 20, the trickle filter construction includes a sand bed base layer 172. A polymeric liner 174 (eg. a geofabric material to prevent the ingress of finer material) is then positioned over the sand bed. However, if the liner is to be impervious to fluid flow thereacross it is typically formed from a non-porous layer (eg. high density polyethylene). A gravel base 176 is then positioned over the layer 174. The bottom tire 177 of each of the stacked tire rows is also infilled with gravel. The sand bed, liner and gravel base are all arranged within a trench 178 in which the trickle filter construction 160 is located. A filter cloth 180 (typically a geofabric material to prevent the ingress of finer material into the above located lowermost layer of the tire sidewall) is then positioned on top of the gravel base. A geofabric layer can also be positioned between (and optionally wrapped around) each bottom tire 177 and the base 176 to prevent the ingress of finer material into the tire sidewalls. The tires and fill 166, 168 are then progressively built up to form the trickle filter construction. Finally the condeck distributor is positioned on top of the construction.

Figure 21:
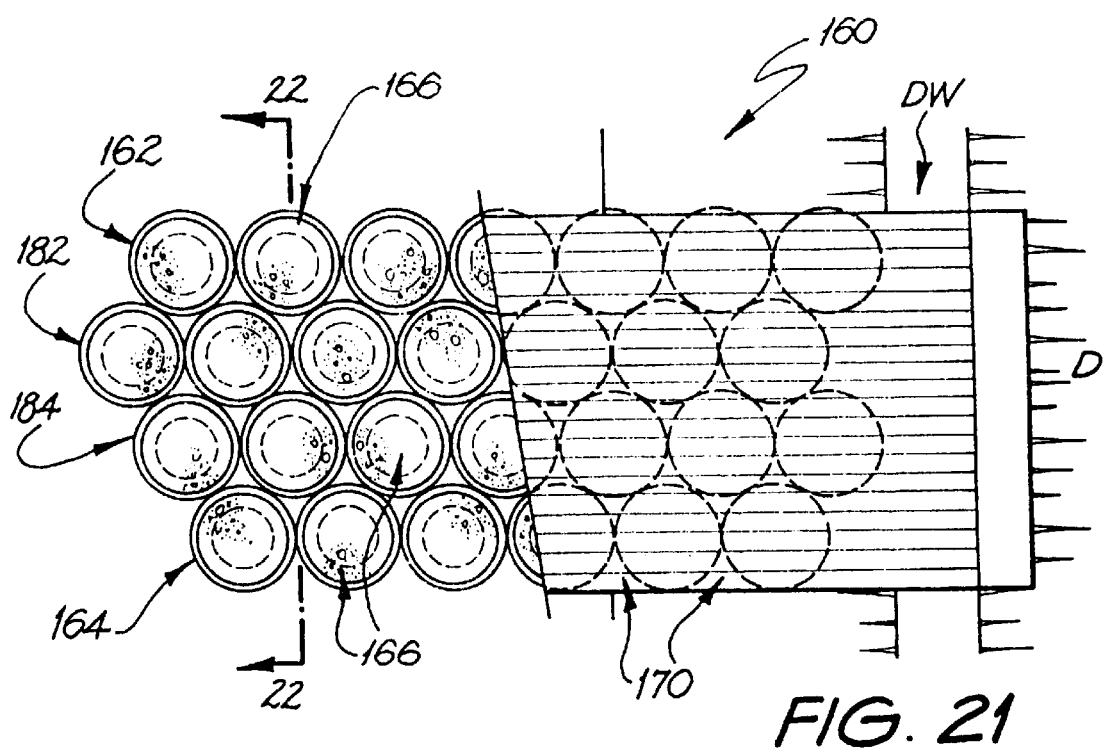
FIGS. 21 and 22 show similar views to FIGS. 18 and 19, but with a different tire arrangement.
Figure 22:
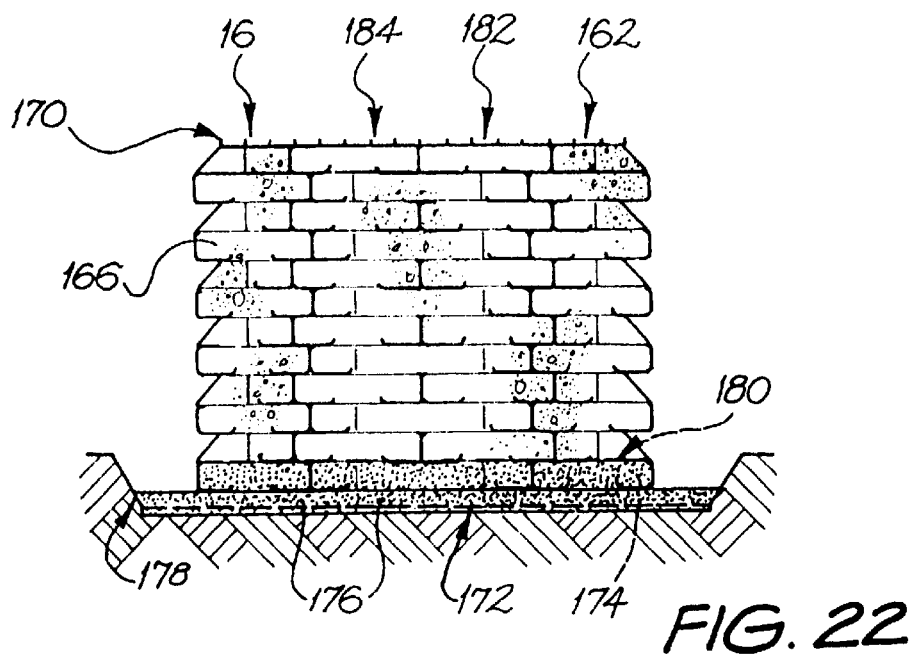

FIGS. 21 and 22 show a similar trickle filter construction to FIGS. 19 and 20, but in this case the fill material region 168 is infilled with further stacked tire rows 182, 184. The trickle filter construction is in all other respects identical to that shown and described for FIGS. 18 to 20. The arrangement in FIGS. 21 and 22 is, however, more stable because of the internal stacked tire rows.

The use of tires and fill in the trickle filler construction as described provides a stable yet fluid porous arrangement, which can also filter out stockpile fines to prevent them entering groundwater and stormwater streams. The high drainage performance of the arrangement further tends to prevent the base of the stockpile from being dispersed into the stormwater. The arrangement can also be used with known "floc blocks" which entrap very fine material that may pass through the filter.

Referring now to FIGS. 23 to 27, a foundation is depicted in the form of a waste disposal cell base for use in a waste disposal leachate recirculation and distribution system.

Figure 23:
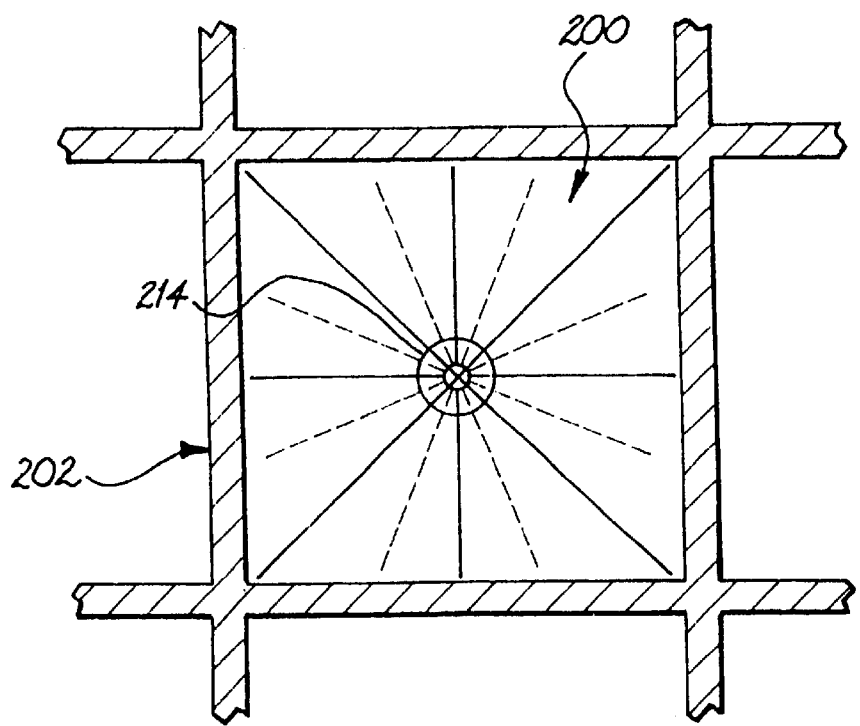

FIG. 23 shows a schematic plan view of one cell 200 in such a waste disposal system. The cell includes sidewalls 202, which define a square cell, and a distribution system 204 (FIG. 24) which is defined by a plurality of tires 206 arranged in predetermined patterns within the cell. The tires are infilled with a stone or cobble material which is selected to provide a desirable filtration characteristic. Typically the fill also surrounds the tires and fills up the remaining spaces in the cell.

Figure 25:
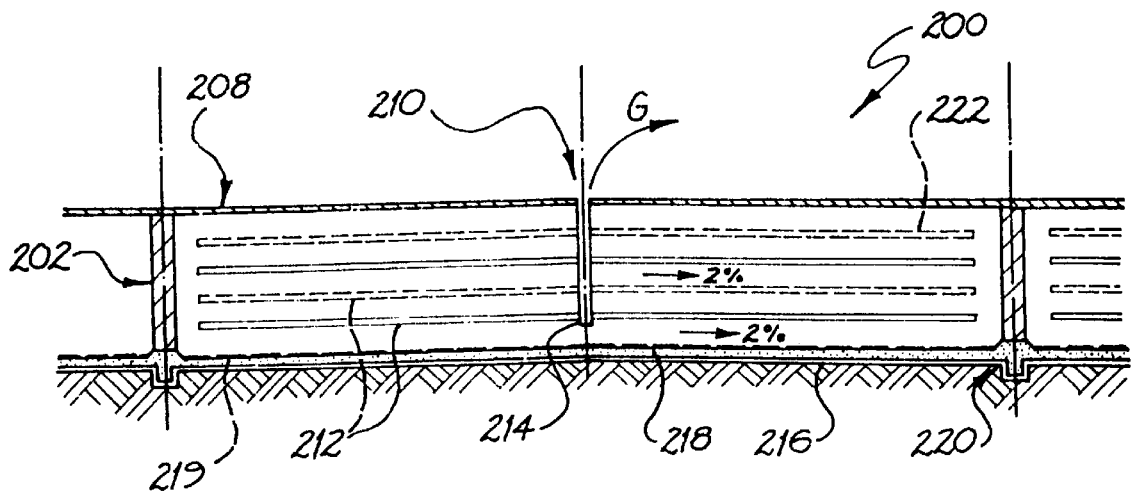
Figure 26:
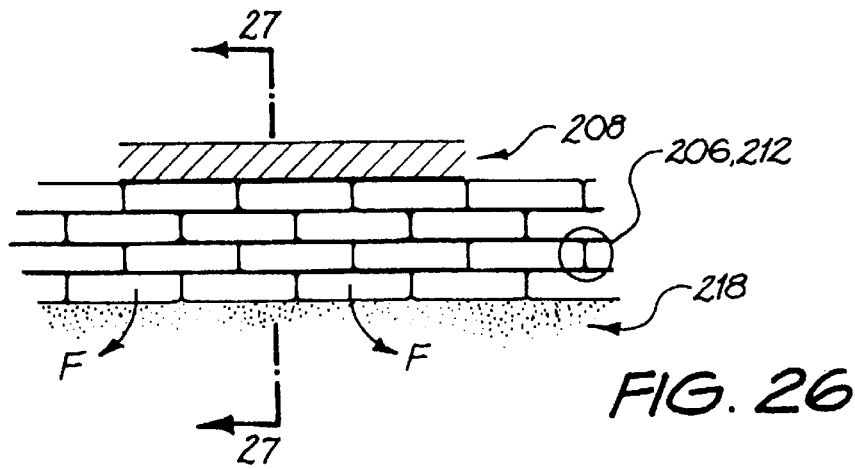
Figure 27:
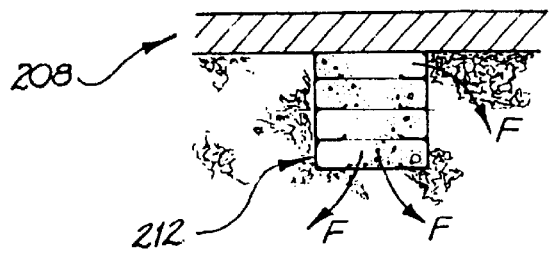

As can be seen in FIG. 25, the cell includes a seal and capping layer 208 which encloses the tires 206, and which has an opening 210 through which leachate to be filtered can be delivered to the cell and from which gas G can be extracted.

The leachate is typically fluid (including water) that has passed through a rubbish/refuse pile overlaying the cell.

Figure 24:
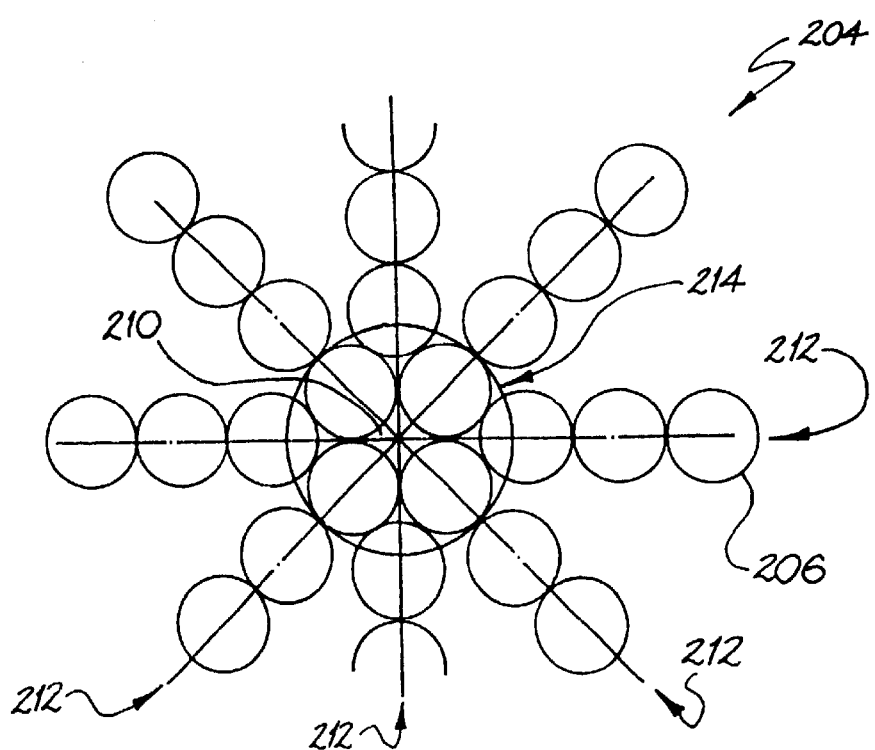

As can be seen, tire distribution channels 212 (which are defined by the tires 206) are sloped downwardly and out from a distribution column 214, itself defined by a column of tires (FIG. 24). As can be seen, the distribution channels slope outwardly and downwardly by approximately 2%.

The base of the cell is defined by a liner 216 (typically a non-porous polymeric liner or a water porous layer such as a geofabric layer can sometimes be used) which prevents the ingress of finer material into the cell. A sand and gravel drainage base 218 is positioned on liner 216. Typically the sand and gravel base is covered by a geofabric layer 219 which can then also be wrapped around a lowest course of the tires. The layer 219 is selected to allow the flow of leachate into base 218 whilst preventing the ingress of finer material into the cell. Thus, the drainage base receives fluid which has passed through the distribution channels (and has been appropriately filtered eg. by layer 219) and distributes this to a leachate underdrain 220 (for further treatment and/or disposal/release). Over time a layer of waste 222 accumulates in the cell, so periodically the cell is back-flushed (eg. via pressurised fluid introduced at drain 220). The flow of leachate down through the distribution channel is illustrated schematically in FIGS. 26 and 27 (flow arrows F).

Figure 28:
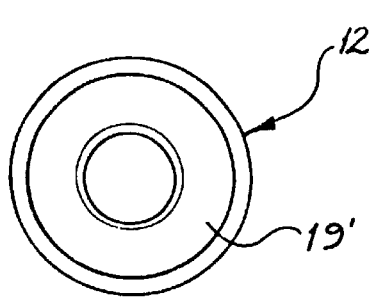
FIG. 28 shows a plan view of a tire with a side wall removed therefrom.
Figure 29:
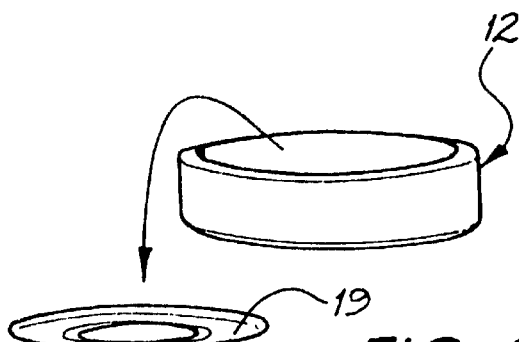
FIG. 29 shows, schematically, a side perspective view illustrating the removal of a tire sidewall.

Turning now to FIGS. 28 and 29 there is shown a tire 12 having the upper sidewall 19 removed therefrom (eg cut therefrom using a tire sidewall cutter) but leaving the lower sidewall 19' intact. Such tires are the most preferred tires used in the various foundations described above.

Figure 30:
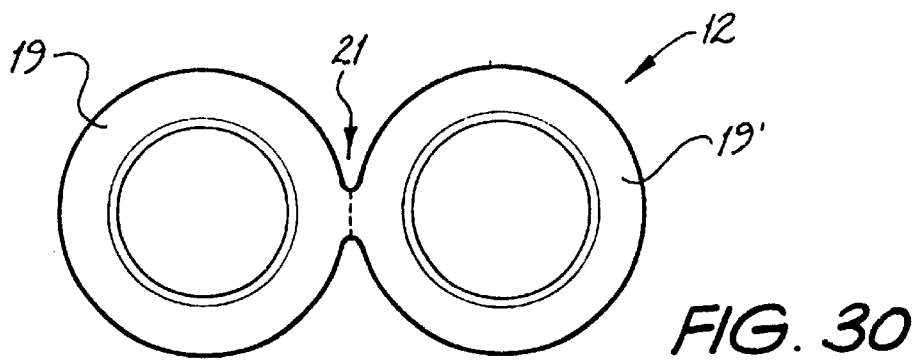
FIG. 30 shows a plan view of an alternative means for "removing" a side wall of the tire (by splitting the tire horizontally through its tread)
Figure 31:
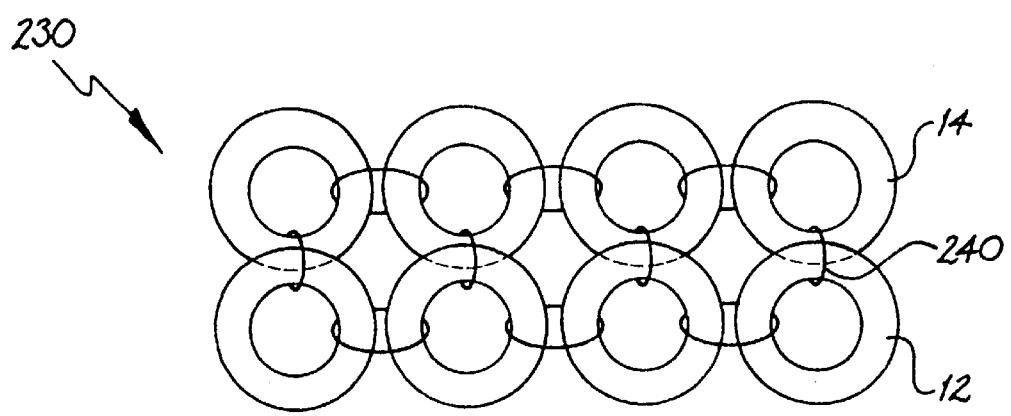
FIGS. 31 to 36 show plan elevations of various ways of arranging and binding the tires in mattress formations within various foundations in accordance with the present invention.
Figure 32:
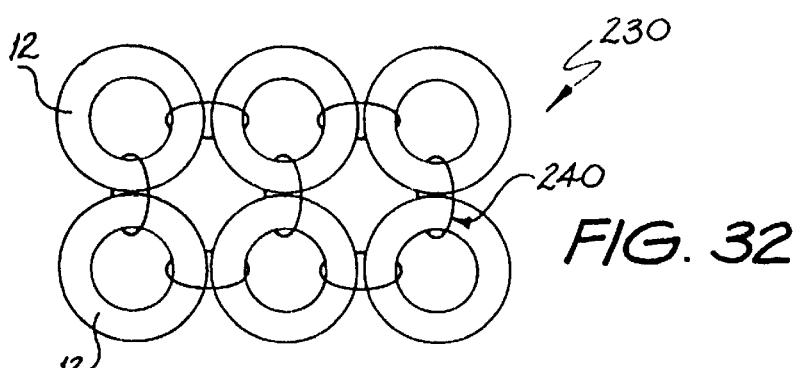
Figure 33:
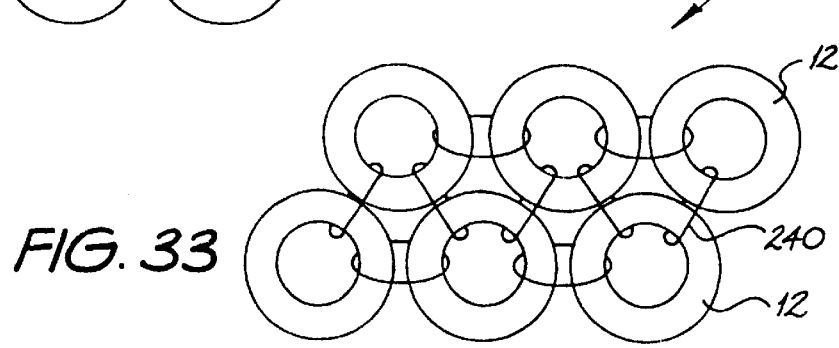

FIG. 30 shows the tire 12 cut almost substantially right around its tread portion, but so as to leave a hinge line 21. This hinge joins the resultant tire halves to each other, and provides an open upper portion in each tire half for receiving aggregate fill therein etc. This arrangement can also be used in any of the foundations described above. Of course, the halves can be separated and can be used individually, but by leaving the halves joined at hinge line 21, an even stronger structure can be obtained. Such arrangements can provide an equivalent function to the tire of FIGS. 28 and 29 when used in the various foundations described.

Referring now to FIGS. 31 to 36, various tire matting arrangements 230 are shown and which can be used in various of the foundations described above. A plurality of tires 12 (and/or tires 14) are joined together by connecting elements 240. The connecting elements can be formed from tie ropes of synthetic or natural fibre, from metal clips, wire, bands, etc.

Figure 34:
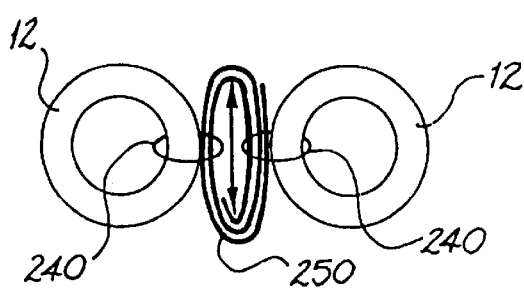

In FIG. 34, it can seen that a coiled length of tire tread or conveyor belt 250 can be positioned between adjacent tires to place the elements 240 in tension, thereby strengthening the bond between the adjacent tires.

Figure 35:
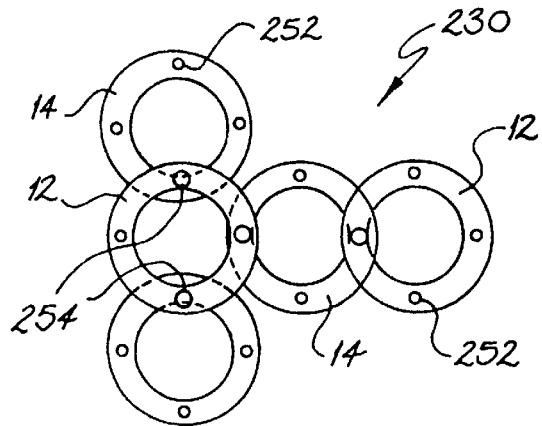

In FIG. 35, it can be seen how upper tires 12 can be fastened to lower tires 14 through fastening holes 252, using appropriate fastening pins 254 (eg. bolts, rivets, clamps or other similar arrangements). Again, this further increases the stability of a foundation employing mattresses configured in this manner.

Figure 36:
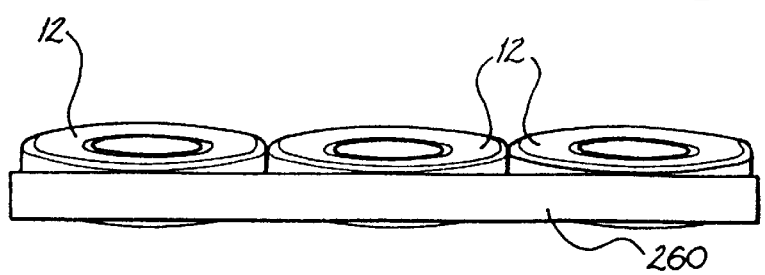

FIG. 36 shows a row of tires 12 which are joined to each other (typically at least on one side thereof) via a length of tire tread or conveyor belt 260 (eg via bolting, riveting, adhesion, ties etc). Again, such a configuration can be employed in any of the foundations described above.

Referring now to FIGS. 43 to 45, causeway 300 includes a pavement 302, a rock-filled tire layer 304 and a sand-filled tire layer 306. The causeway terminates at end wall 308 which provides a barrier to water flow in the direction of arrow F.

Layer 302 can be formed of concrete (eg, fibre reinforced concrete, 300 mm thick), coarse road rock etc. As seen in FIGS. 44 and 45, layer 304 is formed from three courses of rock-filled tires 310, and layer 306 is formed from two courses of sand-filled tires 312. Typically the rock used in the layer 304 is 40 to 70 mm in size, and typically layer 304 is 750 mm thick. Typically the sand-filled layer 306 is 500 mm thick.

End wall 308 is defined by ten stacked rows of rock-filled tires 314. Typically the rock used in the end wall tires is 100 to 200 mm in size for maximum drainage. In addition, a geofabric layer 316 is wrapped around the outer tire courses to prevent the ingress of relatively finer material into the rock of tires 314. The layer 316 can also be wrapped around the lowermost tire course, or around course layer 306.

Inner section 318 of wall 308 is typically a sacrificial layer (eg. formed from concrete, rock etc) and absorbs the bulk of the energy of fluid flowing through the causeway (eg. in the direction of arrow F).

As seen in FIG. 45, under-causeway drains 320 are provided and are supported in discrete concrete elements 322 (eg. fibre reinforced concrete). The drains are located in layer 306 and extend through the causeway and transport away any water permeating through the causeway, thus maintaining the structural integrity of the causeway.

Typically all of the tires used in causeway 300 have an upper side wall removed therefrom to enable close packing of fill material therein.

Referring now to FIGS. 46 to 47A, a roadway intersection 330 is provided for a downwardly sloping roadway 332 and a horizontal roadway 334. Each roadway is constructed from two courses of tires 336, 337 formed in accordance with the present invention. In this regard, typically each tire has its upper side wall removed therefrom and is in-filled with a rock or cobble material. In addition, typically the lower course of tires 337 is wrapped with a geofabric layer 338 to prevent the ingress of finer material therein.

At the intersection of the two roadways, the upper course of tires 336 is replaced with a concrete slab 340 (typically 200 mm thick) and typically reinforced with a steel mesh 342 (eg. F82 mesh). The slab stabilises the intersection and prevents impact erosion from fluid streams flowing across the intersection (eg. down roadway 332).

The lower side of roadway 332 is provided with a drainway which has a first section 344 extending across the roadway and a second section 346 extending along a side edge of the roadway. Drainage section 344 is located beneath the first row of tires in course 336 in the downwardly sloping section of roadway 332. This row is the first row to receive water flowing off the concrete slab, and thus a significant proportion of the water draining through roadway 332 can be captured in drainage section 344.

The second drainage section 346 receives fluid from section 344 and terminates in a pump out sump 348 located at the side of the roadway. The sump can be fitted with a suitable pump to pump water away from the roadway. Typically each drainage section is formed from agricultural pipe.

As best seen in FIG. 47, each drainway section is surrounded by a drainage region 350, typically composed of a free draining backfill material (eg. blue metal, rock, cobble etc). As also shown, the geofabric layer extends around region 350 to again prevent the ingress of a finer road-degrading material therein, and which would otherwise cause drain blockage.

Figure 48:
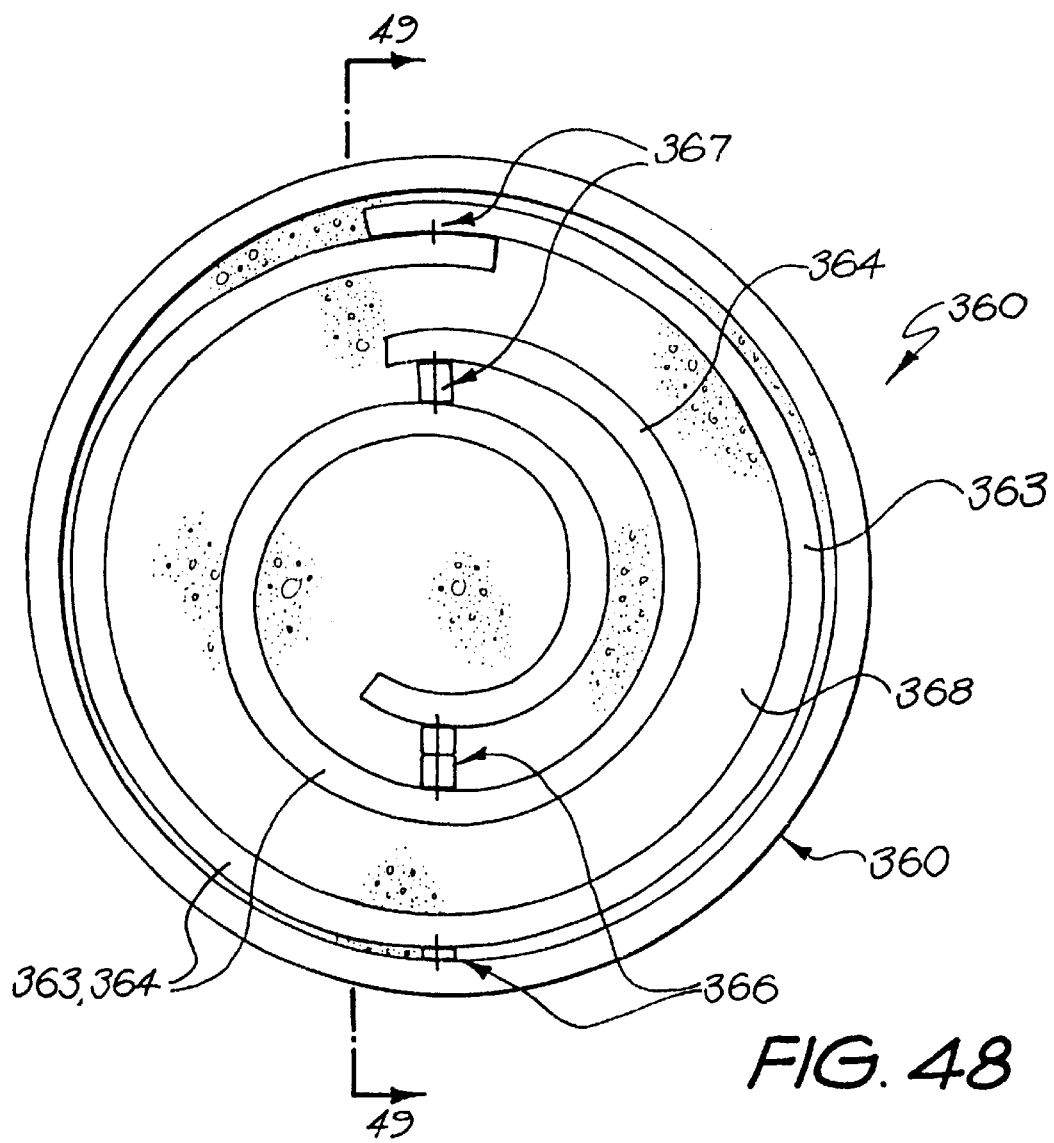
FIG. 48 shows a plan view of a tire for use in a foundation and that has been reinforced internally in accordance with the present invention.
Figure 49:
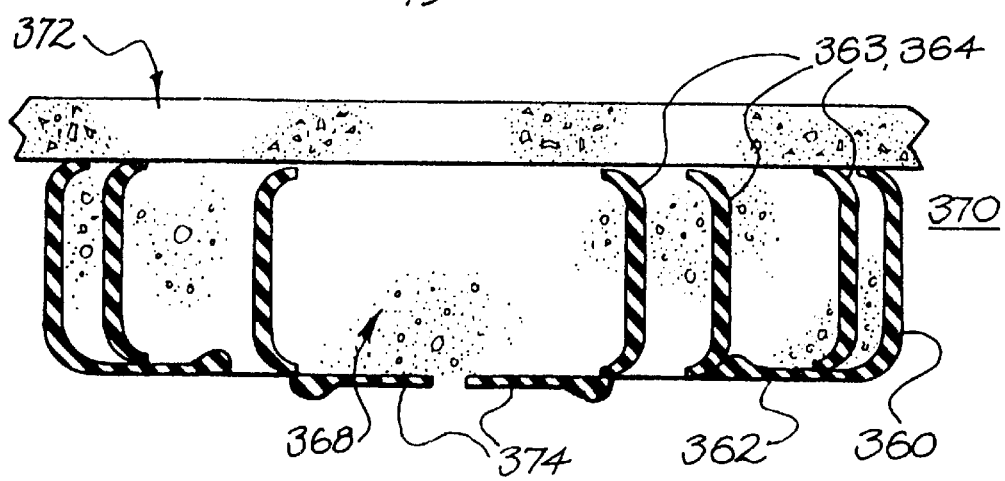
FIG. 49 shows a sectional view through the tire of FIG. 48 taken on the line 49—49.

Referring now to FIGS. 48 and 49, an alternative means for in-filling a tire with an upper side wall removed therefrom is shown. The tire 360 has its lower side wall 362 intact but its upper side wall removed therefrom as shown. Two lengths of tire tread (or conveyor belt) 363 and 364 are arranged within the tire as shown. Spacer elements 366 (typically formed from small sections of tire tread) are positioned as shown between the tire lengths and are joined thereto by pins 367. The spacer elements maintain a space between adjacent lengths and also between the tire inner wall.

Fill material 368 (eg. sand, fine rock etc) is then dispersed around the tire tread lengths as shown, and so the tire tread lengths provide an additional reinforcing function to the fill material within the tire. Thus, not only may fill material be compacted within the tire (by virtue of the upper side wall removal), but it may also be reinforced therewithin, which further enhances the structural integrity of the tire in any foundation in which it employed.

FIG. 49 shows the tire of FIG. 38 in cross section and when located in a foundation structure generally indicated as 370. A cover layer 372 (eg. a roadway or causeway upper layer, a concrete slab, pavement etc) is provided above the tire. Optionally, cut tire side wall 374 (eg. the upper side wall of the tire) can be placed in/at the lower opening of the tire to provide support for inner tire tread length 364.

Figure 50:
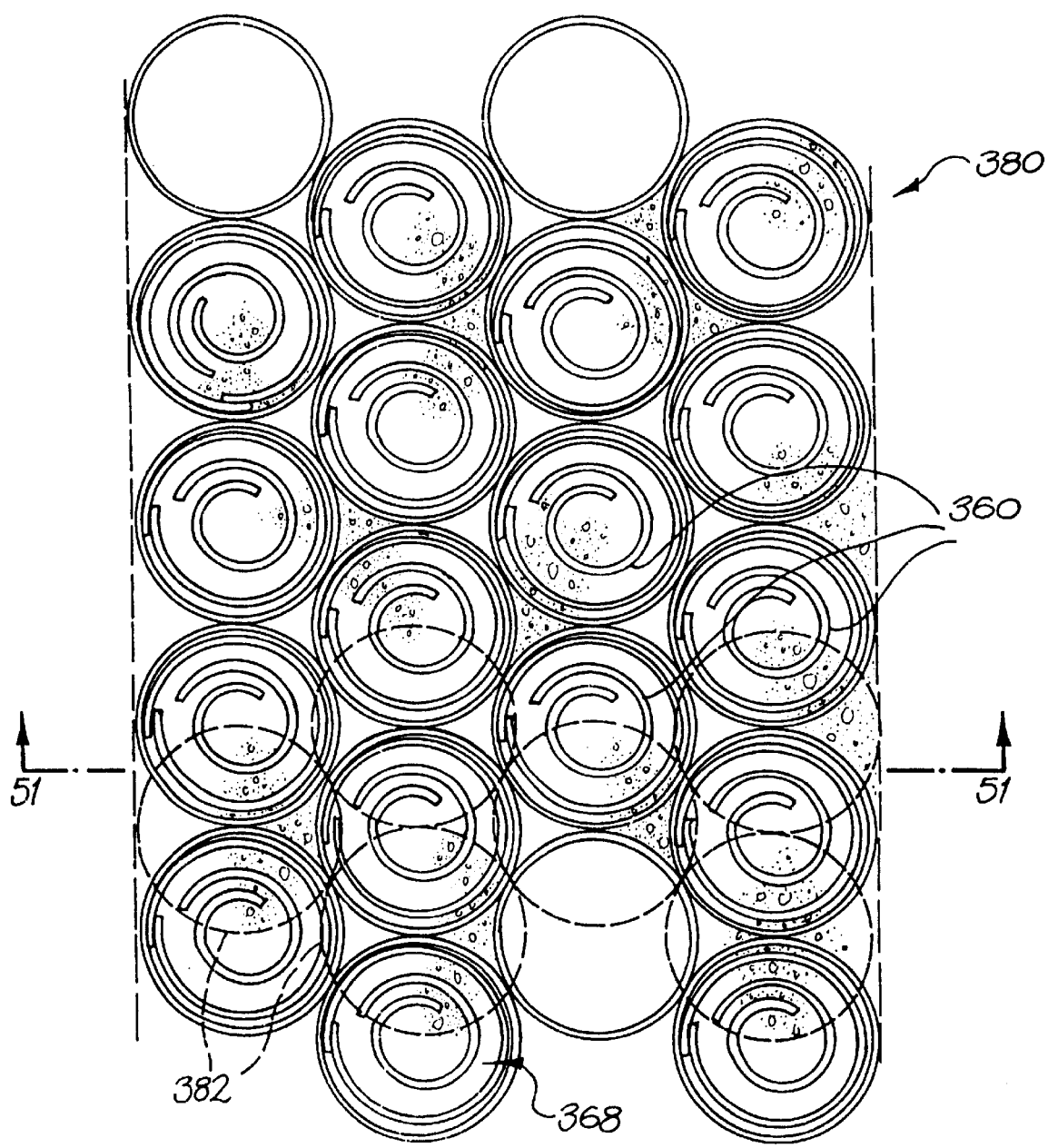
FIG. 50 shows a plan view of a roadway constructed using tires according to FIG. 48, and FIGS. 51 and 52 show sectional elevations through the roadway, for two alternative roadway embodiments.
Figure 51:
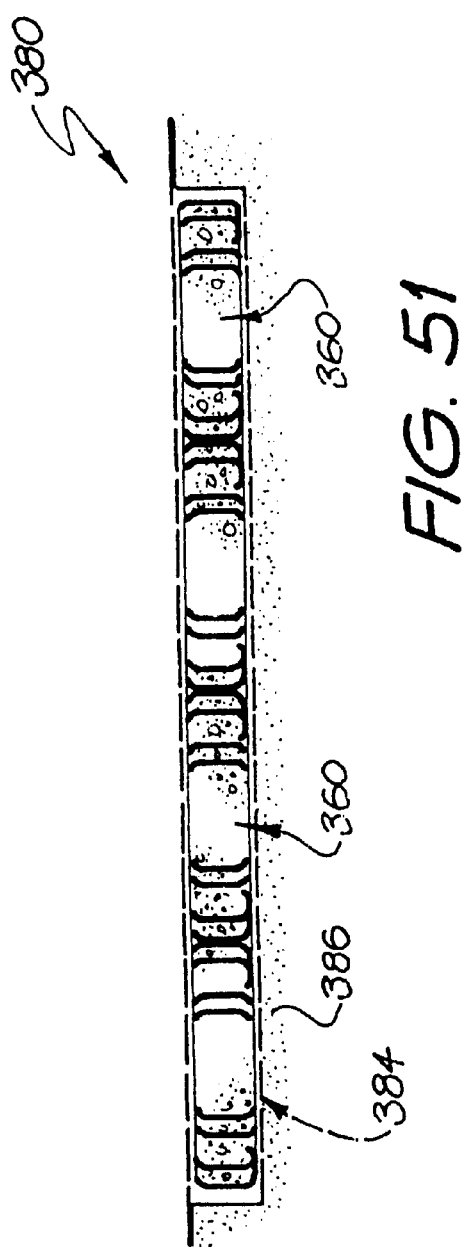
Figure 52:
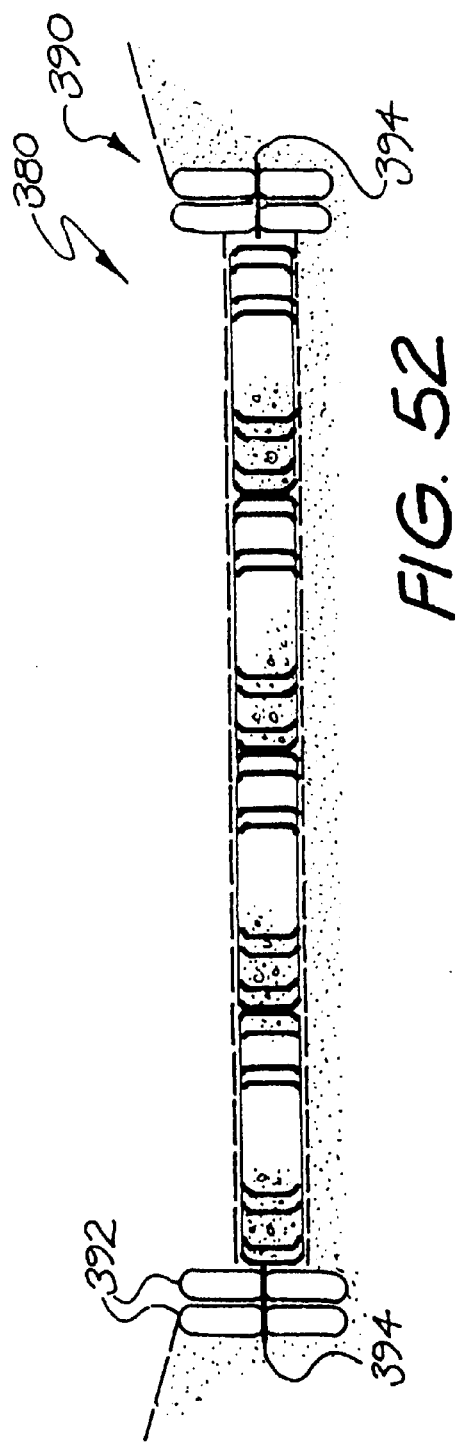

Referring now to FIGS. 50 to 52, a roadway 380 formed using reinforced tires 360 is depicted. As previously described, the roadway may be formed from one course only, or one or more additional offset upper courses 382 (shown in dotted outline) can be provided.

Referring to FIG. 51, typically a geofabric layer 384 is provided around the lower tire course, to prevent the ingress of finer material into the tires (eg. from or via the sand subgrade base 386).

Referring to FIG. 52, a construction similar to FIG. 51, but more deeply recessed into surrounding ground G is shown. To stabilise the ground and roadway, a kerb 390 can be provided on both sides of the roadway. Typically the kerb 390 is formed from a pair of folded tire walls 392 (or optionally a pair of folded tire treads, or various combinations of walls and treads). The folded walls can be joined by pins 394 (eg. galvanised steel pins). Thus, a kerb and gutter type configuration can be provided with the roadway.

The roadway 380 of FIGS. 50 to 52 is, in all other respects, similar in construction to the other roadways described herein in more detail.

Figure 53:
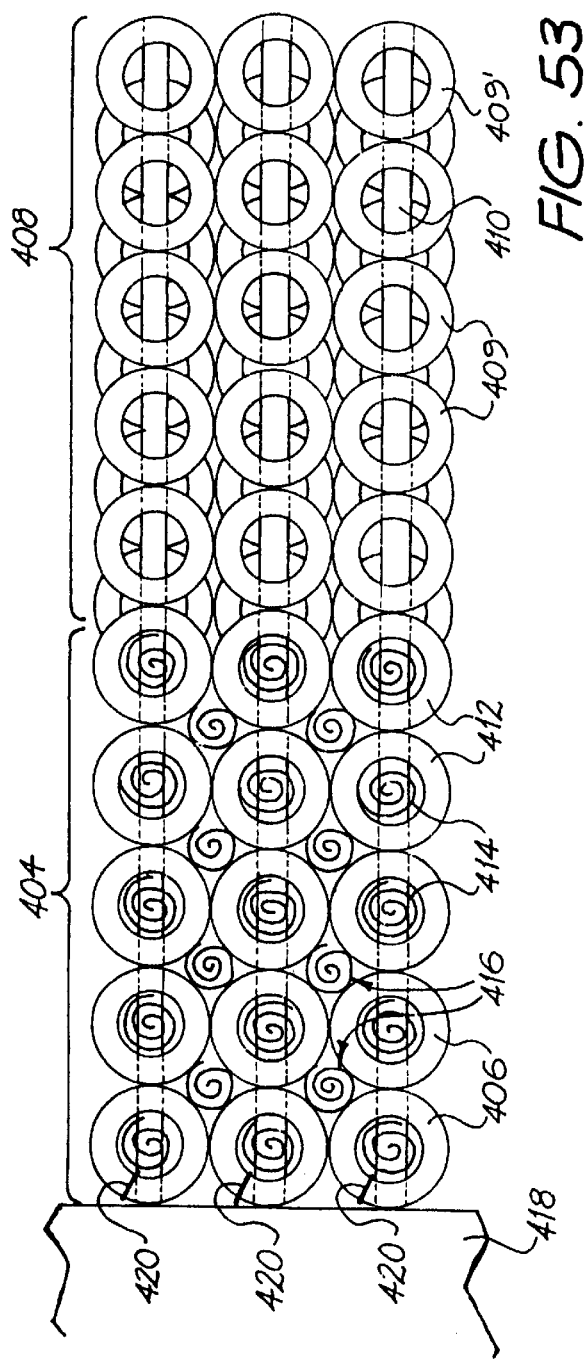
FIG. 53 shows an alternative bank protection foundation incorporating tires in accordance with FIG. 48.
Figure 54:
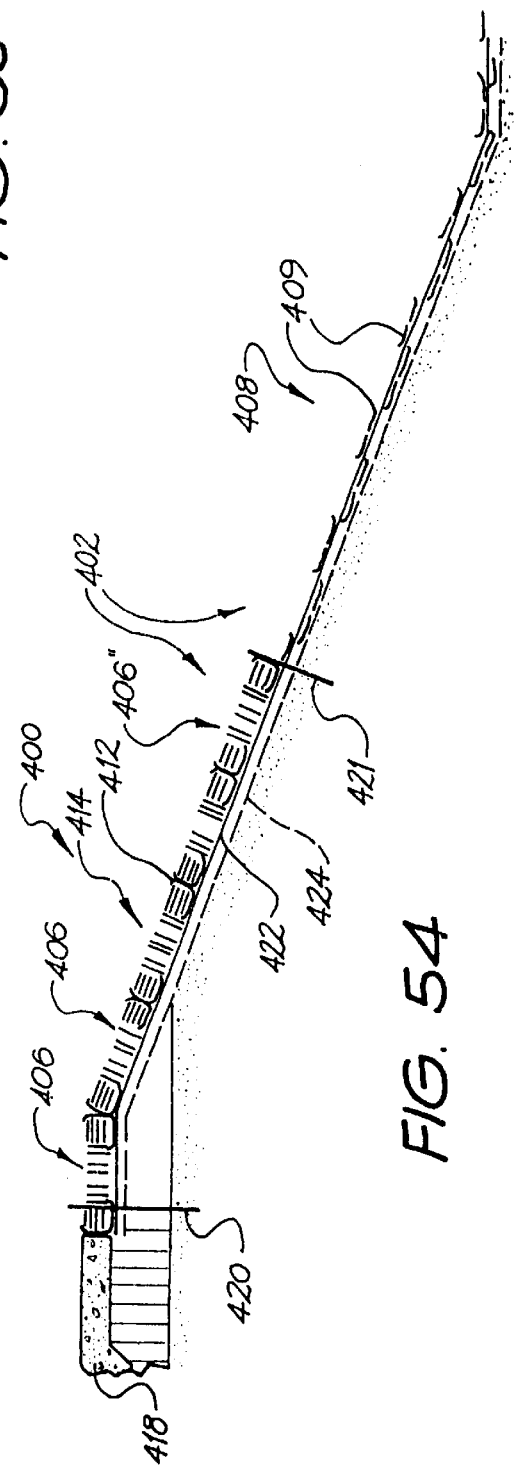
FIG. 54 shows a side sectional elevation through the bank protection foundation of FIG. 53.

Referring now to FIGS. 53 and 54, an alternative bank protection foundation 400 is shown. The bank protection foundation includes a bank protection mat 402 (eg. a wave mat) having an upper region 404 formed from internally reinforced tires 406. The mat also includes a lower region 408 formed from tire side walls 409 and tire tread lengths (or conveyor belt lengths) 410.

The tires 406 are internally reinforced somewhat similarly to tire 360 (of FIGS. 48 and 49). However, in tires 406, a stack 412 of tire side walls is arranged within each tire, to be virtually flush with the upper opening of each tire (ie. the opening that results from the removal of the tire upper side wall). In addition, a spiral coil 414 of tire tread length (or conveyor belt length) is arranged within the side wall stack 412.

In one preferred arrangement the length 410 can extend from the uppermost (horizontal) tire 406' and right throughout the mat 402 to lowermost tire side wall 409'. Length 410 also provides a support (similar to cut tire side walls 374 in FIGS. 48 and 49) for the spiral coil 414. The length also greatly enhances the unitary structure of mat 402.

As best seen in FIG. 53, spiral coils 416 of tire tread (or conveyor belt) can also be provided in the space between four adjacent tires as shown. Coils 416 have a tendency to unwind and thus put pressure on the adjacent tires. This has the effect of tensioning up the entire mat structure, thus enhancing its unitary configuration. The coils also enhance any wave force absorption when adjacent tires are impacted upon.

Uppermost tire 406' is located adjacent to a concrete edging (eg. pathway) 418, and is pinned there against by an upper anchor pin 420. Similarly, the lowermost tire 406" is pinned in positioned by lower anchor pin 421.

Typically the tires 406 are in-filled with a rock or cobble material, and a plastic membrane 422 (eg. PVC sheet) is arranged under the upper region 404 to prevent water from passing through the mat, and enabling it to drain down into the lower region 408 (and thus back into the adjacent water body). The more open configuration of the lower region 408 also enables water to drain therethrough (eg. water that has flowed down out of the upper region).

A geofabric layer 424 is provided under the plastic membrane, again to prevent the ingress of finer material into the mat construction. It may also be wrapped around and fastened to the entire mat (eg. by fastening pins, clamps etc).

Typically the tires in mat 402 are all pinned together (eg. using galvanised pins or clamps, nuts and bolts etc) and the lengths 410 and coils 416 are also typically pinned to the tires 406 and the tire side walls 409.

Figure 56:
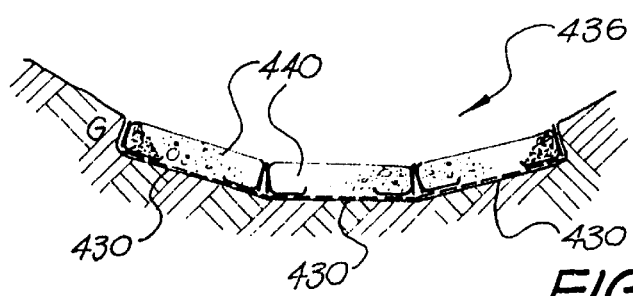
FIGS. 56 and 57 show, respectively, end and side sectional elevations through the arrangement of FIG. 55.
Figure 57:
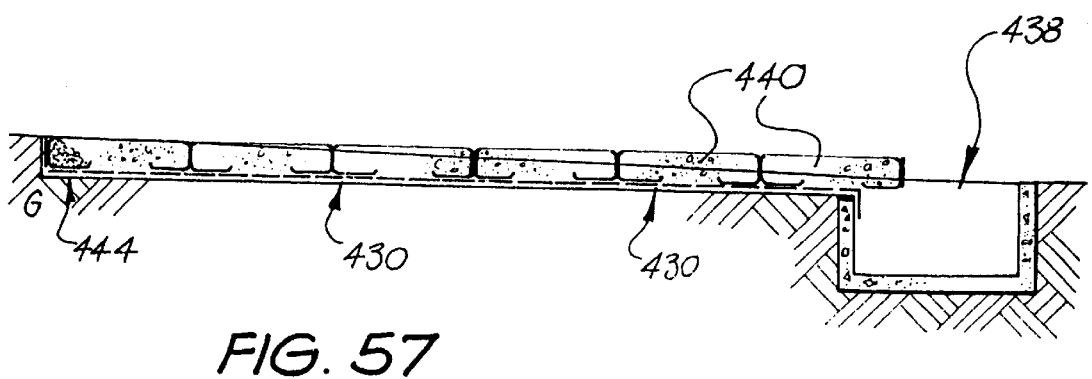
Figure 58:
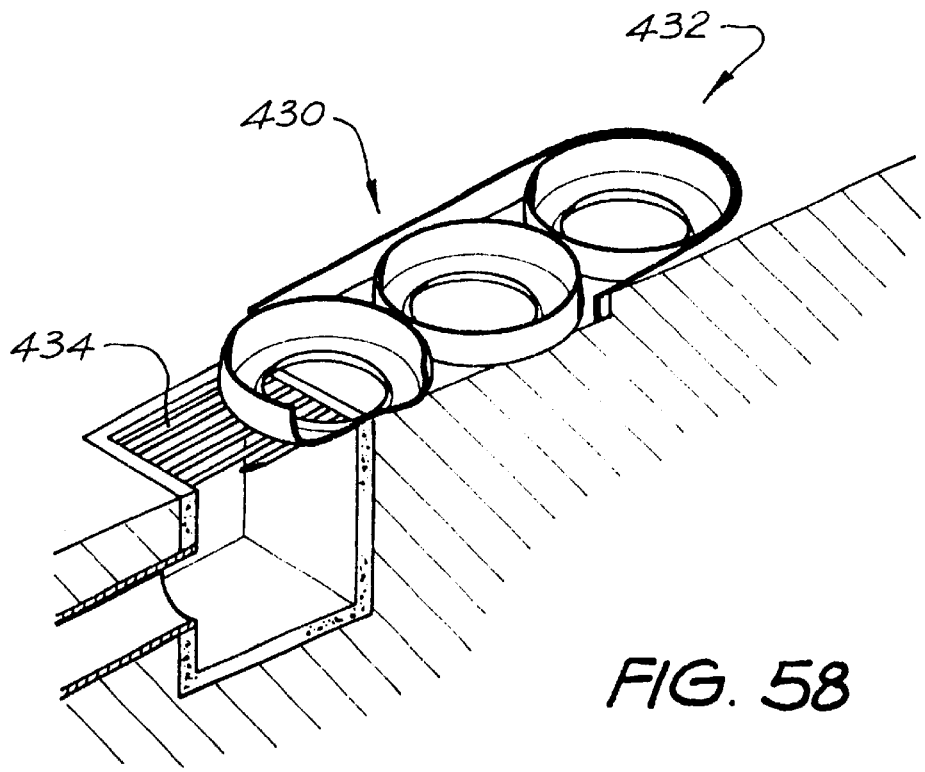
FIG. 58 shows an individual silt barrier unit foundation in perspective view and associated with a drain.

Referring now to FIGS. 55 to 58, a foundation in the form of a silt trap unit 430 is depicted. In FIG. 58, an exposed form of a silt trap unit 430 is shown at the end of the drainage channel 432, the silt trap unit being located at the terminus of the drainage channel to drain 434. In use, the unit is typically covered (buried) by a fill/drainage material such as sand, rock or similar and is optionally wrapped in a porous geofabric layer (to prevent the ingress of fine material).

Figure 55:
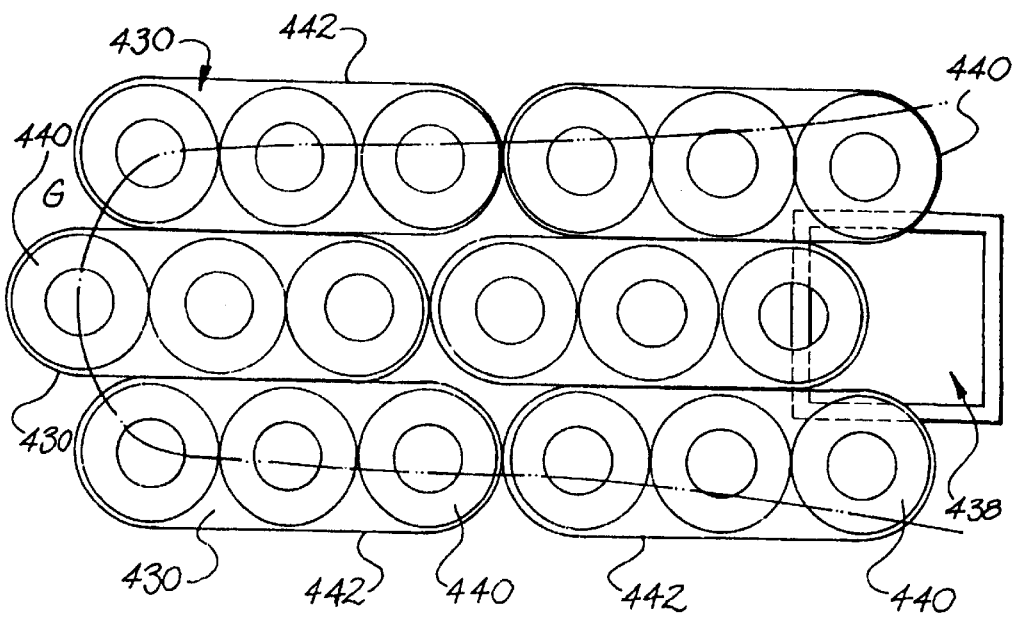
FIG. 55 shows a plan elevation of a foundation in the form of silt barrier units arranged in a drainage causeway in accordance with the present invention.

In FIGS. 55 to 57, six silt trap units are arranged at the terminus of a larger drainage channel or causeway 436, terminating at drain 438 (eg. a concrete pit).

Each silt trap unit 430 includes three tires 440 (having an upper side wall removed therefrom) and joined together. The unit is further integrated by wrapping around the three tires and fastening thereto tire tread lengths (or conveyor belt lengths) 442 as shown.

In construction of the silt trap drain, the ground G adjacent to the drain is excavated, and the silt trap units are laid therein. Typically the silt trap(s) are also laid on (or wrapped in) a geofabric layer 444 prior to being laid in the excavated site and filled. The silt traps are then filled (and are typically covered) with a fill material (eg. sand, fine or coarse grade rock, blue metal or cobble etc) and parts of the silt trap may then be recovered by the ground G (as best shown in FIGS. 55 and 56), providing a slope into the traps.

The silt traps are filled to have a natural drainage capacity, more so than the surrounding ground, and thus any fluid born solids (silt) in water that is flowing down through the drainage channel or causeway and over the silt traps, can be deposited and thus trapped in the silt trap. This helps to minimise or eliminate drain blockage with silt. The silt traps can be periodically cleaned if necessary.

Figure 59:
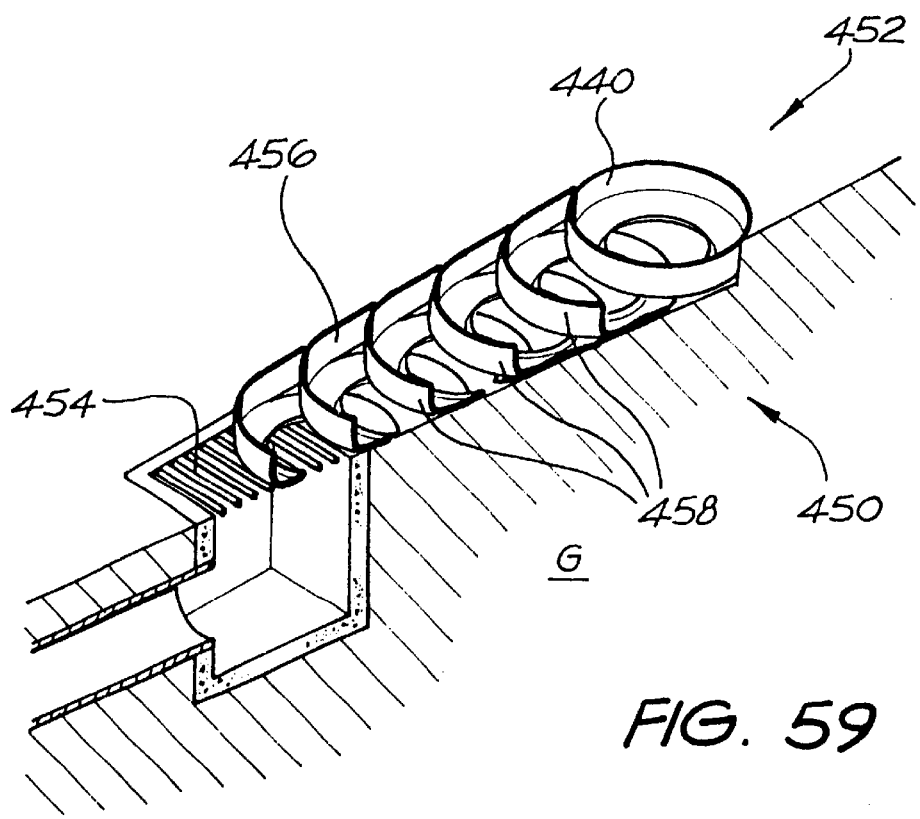
FIG. 59 shows an alternative silt barrier foundation to that of FIG. 58 when located in a V drain configuration.

Referring now to FIG. 59, a foundation in the form of alternative silt trap unit 450 is shown, arranged at the terminus of V-drainway 452 to drain 454. The unit is surrounded by tire tread lengths (or conveyor belt) 456 and again is typically wrapped in a porous layer (such as geofabric textile). However, rather than employing only whole tires (each with an upper side wall removed therefrom) the unit includes both whole tires 440 and half tires 458 (both still having an upper side wall removed therefrom).

Each half tire defines an individual silt catchment region, with the curve of the half tire facing the oncoming fluid flow down drain 452. Thus an enhanced (doubled) trapping function (over the unit 430) is provided by unit 450.

In all other respects, the unit 450 can be constructed and positioned in place as per the units 430 of FIGS. 55 to 58.

The general steps involved in construction of, for example, a roadway or drainage floor will now be outlined for illustrative purposes only.

1. Minimal (if any) site excavation is conducted depending on the sub-base stability and requirement for excavating trenches in providing edge support.
2. Geofabric cloth or another suitable porous sheet is laid at the location of the roadway or drainage floor with excess geofabric provided on opposing sides of the roadway or drainage floor to allow for wrapping of the geofabric about at least the lower mattress of tires.
3. The lower mattress of tires (typically already having the upper sidewall removed therefrom) is located on the geofabric and a suitable fill material, preferably relatively coarse aggregate, is spread between and through the tires of the lower mattress and is typically then compacted.
4. The excess geofabric is wrapped over an upper surface of the lower mattress thereby enveloping the tires of the lower mattress together with the bed of rock aggregate.

5. An upper layer of tires (again having the upper sidewall removed) is located upon and in a staggered relationship relative to the lower mattress of tires. The upper layer can also be located on a geofabric cloth or porous sheet, optionally with excess cloth being provided for upper layer wrapping.

6. The upper mattress of tires is in-filled with the relatively coarse aggregate material and is typically then compacted. Usually surplus aggregate is provided so as to form a layer of aggregate above the upper mattress of tires.

The applicant has conducted tests on roadways and similar foundations constructed in accordance with the steps described above. The preliminary tests involved passing a laden truck of approximately 21 tonne across both a single and two-layered tire mattress similar to that described. The foundation was constructed on a sub-base with no preparation having a relatively high level of saturation. The foundation showed no signs of degeneration or any associated problems during the testing.

Now that several preferred embodiments of the present invention have been described in some detail it will be apparent to those skilled in the art that the foundations described, and associated methods of construction, have at least the following advantages:

1. The foundation can be constructed with limited sub-base preparation eliminating the need for relatively heavy earthmoving machinery;
2. The foundation has one or more layers of tires together with a suitable fill material and is thus well suited to construction upon relatively unstable or saturated ground;
3. The positioning of a layer porous to water but impervious to finer grade material under the lowermost layer enhances the life of the foundation, and minimises fill degradation (due to the ingress of relatively finer material);
4. The foundation is relatively inexpensive and simple to construct whilst requiring minimal maintenance; and
5. The foundation disposes of and utilises efficiently waste and used tires, conveyor belts, and other waste materials (which otherwise represent an environmental hazard).

Those skilled in the art will appreciate that the invention described herein is susceptible to variations and modifications other than those specifically described. For example, the foundation may be formed from one or more tire layers depending largely on the ground stability and loading requirements. The fill material may alone provide sufficient drainage capacity to avoid silting of the fill material bed.

Construction of the various foundation arrangements may vary in specific detail whilst remaining within the scope of the present invention. For example, the lowermost layer or mattress of tires may be laid upon a bed of tire sidewalls, rather than directly upon the ground/sub-base or geofabric cloth, which bed can provide added stability to an otherwise relatively unstable or saturated sub-base. Those sidewalls may also be tied together (similar to those techniques described above). The drainage floor, wave banks etc may be extended to include a single or multi-layered tire mattress extending up the embankment. A silt barrier formed of one or more tire layers extending transversely across the drainage floor together with a throughgoing pipe may also be provided to remove silt flowing along the drainage floor. The silt barrier can function in the same way as a "berm" with the silt barrier tires being located upon and the throughgoing pipe passing through a bed of stone provided on the drainage floor.

Of course tires from any vehicle type can be employed in the various foundations in accordance with the present invention including car, truck, tractor, four-wheel drive automobiles, etc.

All such variations and modifications are to be considered within the scope of the present invention, which can be embodied in many other forms.

What is claimed is:

1. A foundation comprising one or more layers of tires including a lowermost layer being located adjacent to the ground on a porous geofabric material, with tires in the lowermost layer having an upper sidewall removed therefrom and being provided therewithin with a fill material having a preselected grade;

wherein the lowermost layer is enclosed within the geofabric material, and further fill material of preselected grade and/or one or more further layers of tires overlay the enclosed lowermost layer to define the foundation.

2. A foundation as claimed in claim 1, wherein the geofabric material is adapted for allowing the passage of water through the lowermost layer whilst preventing the ingress of matter of a grade finer than the fill material into the lowermost layer.

3. A foundation as claimed in claim 1, wherein at least one of the tires in the one or more layers has a side wall removed therefrom.

4. A foundation as claimed in claim 3, wherein all tires in the one or more further layers have their in use upper sidewall removed therefrom, and fill material introduced therein is compacted in each layer and in each tire.

5. A foundation as claimed in claim 1, wherein the tires within each of the layers are laid generally horizontally and are located adjacent to one another in a fixed array, with each of the layers in conjunction with the fill material forming a tire mattress.

6. A foundation as claimed in claim 5, wherein the tire mattresses are offset with respect to adjacent layers to provide distribution of the load between adjacent tires.

7. A foundation as claimed in claim 6, wherein one tire in one layer overlays up to four tires in an underlying adjacent layer.

8. A foundation as claimed claim 1, wherein the fill material is a rock aggregate or cobble of a relatively coarse grade.

9. A foundation as claimed in claim 1, further comprising an edge support structure that is located on opposing sides of at least an uppermost layer of the layers of tires, wherein the support structure is adapted to inhibit lateral movement of the tires.

10. A foundation as claimed in claim 9, wherein the edge support structure includes a row of support tires located alongside and coupled via a link structure to at least one side of the uppermost layer of tires.

11. A foundation as claimed in claim 10, wherein the link structure includes a series of lateral tie elements each linking one of the support tires to an adjacent tire of the uppermost layer and a longitudinal link element interconnecting the tie elements.

12. A foundation as claimed in claim 11, wherein the lateral tie elements and longitudinal link elements are constructed of tire tread connected end-to-end, or are constructed of conveyor belt material.

13. A foundation as claimed in claim 1, further comprising a series of drainage tires located adjacent to one another within a trench excavated underneath the lowermost layer of tires, with a drainage fill material being provided within or cog between the drainage tires.

14. A foundation as claimed in claim 13, wherein one or more drainage channels extend from the trench so as to drain water away therefrom.

15. A foundation as claimed in claim 1, wherein at least some of the tires within the foundation have tire portions arranged therewithin as additional reinforcement.

16. A foundation as claimed in claim 15, wherein, in addition to fill material, each tire has its upper sidewall removed therefrom and has one or more coiled tire treads arranged therewithin, or a stack of tire sidewalls arranged therewithin, or combinations thereof.

17. A foundation as claimed in claim 1, wherein each tire in the foundation has an intact tread portion.

18. A foundation as claimed in claim 17, wherein, when the foundation is employed in drains, drainage channels and silt traps, part tires are also or optionally employed.

19. A foundation as claimed in claim 18, wherein each part tire is half a tire and has an upper side wall removed therefrom.

20. A foundation as claimed in claim 18, that is formed by arranging lengthwise a single row of tires, and by wrapping the row with at least one length of tire tread or conveyor belt to form an integrated and portable unit.

21. A foundation as claimed in claim 20, wherein each layer further includes at least one unit, each unit having three tires arranged end-to-end, each with an upper sidewall removed therefrom, and with the at least one length of tire tread or conveyor belt extending around and joined to the tires.

22. A foundation as claimed in claim 1 that is provided within:

a road; ground or sub base in sand and wetlands; a drainage way, course or channel; a railway track base; a mining road or tunnel; a ramp, slope or mat adjacent to lakes, rivers creeks, oceans; a wave dissipation or breakwater wall; a waste cell pit; a stockpile base or pavement; or a silt trap.

23. A method of constructing on ground a foundation as defined in claim 1 including the steps of:

positioning on the ground the geofabric material; locating the lowermost layer of tires on the geofabric material; filling tires in the lowermost layer with the fill material; and folding the geofabric material to enclose the lowermost layer within the geofabric material.

24. A method as claimed in claim 23 including further step of overlaying the enclosed lowermost layer with the further fill material and/or the one or more further layers of tires.

* * * * *

UNITED STATES PATENT AND TRADEMARK OFFICE
CERTIFICATE OF CORRECTION

PATENT NO. : 6,705,803 B2  Page 1 of 1
DATED : March 16, 2004
INVENTOR(S) : Callinan et al.

It is certified that error appears in the above-identified patent and that said Letters Patent is hereby corrected as shown below:

Column 18,
Line 63, claim 13 should read as follows:
A foundation as claimed in claim 1, further comprising a series of drainage tires located adjacent to one another within a trench excavated underneath the lowermost layer of tires, with a drainage fill material being provided within or between the drainage tires.

Signed and Sealed this

Twenty-fifth Day of May, 2004

JON W. DUDAS
*Acting Director of the United States Patent and Trademark Office*